US012685352B2

(12) United States Patent (10) Patent No.: US 12,685,352 B2
Motegi et al. (45) Date of Patent: Jul. 21, 2026

(54) SANITARY MASK SHEET

(71) Applicant: Kao Corporation, Tokyo (JP)

(72) Inventors: Tomoyuki Motegi, Haga-gun (JP);
Ryota Shiiba, Haga-gun (JP);
Masataka Ishikawa, Haga-gun (JP);
Yuta Abe, Haga-gun (JP)

(73) Assignee: KAO CORPORATION, Tokyo (JP)

( * ) Notice: Subject to any disclaimer, the term of this
patent is extended or adjusted under 35
U.S.C. 154(b) by 417 days.

(21) Appl. No.: 18/272,813

(22) PCT Filed: Dec. 15, 2021

(86) PCT No.: PCT/JP2021/046344
§ 371 (c)(1),
(2) Date: Jul. 18, 2023

(87) PCT Pub. No.: WO2022/163187
PCT Pub. Date: Aug. 4, 2022

(65) Prior Publication Data
US 2024/0081438 A1 Mar. 14, 2024

(30) Foreign Application Priority Data

Jan. 28, 2021 (JP) ................................. 2021-012296

(51) Int. Cl.
*A41D 13/11* (2006.01)
*A62B 23/02* (2006.01)
(Continued)

(52) U.S. Cl.
CPC ........ *A41D 13/113* (2013.01); *A41D 13/1161*
(2013.01); *A62B 23/02* (2013.01); *B01D*
*39/1623* (2013.01); *B01D 46/526* (2013.01);
*B32B 3/30* (2013.01); *B32B 5/022* (2013.01);

*B32B 5/267* (2021.05); *D04H 1/4291*
(2013.01); *D04H 1/43838* (2020.05); *D04H*
*1/56* (2013.01);
(Continued)

(58) Field of Classification Search
CPC . A41D 13/11; A41D 13/1107; A41D 13/1115;
A41D 13/1161; A41D 13/1123; A41D
13/113; A41D 13/1138; A41D 13/1184;
A62B 23/025
See application file for complete search history.

(56) References Cited

U.S. PATENT DOCUMENTS 5,620,545 A * 4/1997 Braun ................... B01D 39/08
156/205
2005/0133036 A1 6/2005 Steindorf
2022/0136149 A1 5/2022 Nakayama et al.

FOREIGN PATENT DOCUMENTS

EP 0582286 A 2/1994
JP H04180808 A * 6/1992
(Continued)

OTHER PUBLICATIONS

Ishigami Makoto, Disposable Mask, Jul. 27, 2006.*
(Continued)

*Primary Examiner* — Alireza Nia
*Assistant Examiner* — Andrew Jun-Wai Mok
(74) *Attorney, Agent, or Firm* — XSENSUS LLP

(57) ABSTRACT

A sanitary mask sheet, in which a WC value indicating a
work volume up to a maximum pressure in a thickness
direction is 0.3 Pa·m or more, and a capture rate of particles
having a particle diameter of more than 1 µm is 85% or
more.

19 Claims, 12 Drawing Sheets

(51) Int. Cl.

| | | |
|---|---|---|
| *B01D 39/16* | (2006.01) | |
| *B01D 46/52* | (2006.01) | |
| *B32B 3/30* | (2006.01) | |
| *B32B 5/02* | (2006.01) | |
| *B32B 5/26* | (2006.01) | |
| *D04H 1/4291* | (2012.01) | |
| *D04H 1/4382* | (2012.01) | |
| *D04H 1/56* | (2006.01) | |
| *D04H 1/728* | (2012.01) | |

(52) U.S. Cl.

CPC ..... *D04H 1/728* (2013.01); *B01D 2239/0618* (2013.01); *B01D 2239/0654* (2013.01); *B01D 2239/069* (2013.01); *B01D 2239/1233* (2013.01); *B01D 2239/1291* (2013.01); *B01D 2279/40* (2013.01); *B32B 2262/0253* (2013.01); *B32B 2262/16* (2021.05); *B32B 2307/546* (2013.01); *B32B 2571/00* (2013.01); *D10B 2321/022* (2013.01); *D10B 2401/062* (2013.01); *D10B 2509/00* (2013.01)

(56) References Cited

FOREIGN PATENT DOCUMENTS

| | | | | | |
|---|---|---|---|---|---|
| JP | H06-34719 | U | 5/1994 | | |
| JP | H06-192951 | A | 7/1994 | | |
| JP | H09-192247 | A | 7/1997 | | |
| JP | H09-192248 | A | 7/1997 | | |
| JP | 2002-105826 | A | 4/2002 | | |
| JP | 2006191964 | A | * 7/2006 | ..........  | A62B 23/025 |
| JP | 2007-037737 | A | 2/2007 | | |
| JP | 2007-515248 | A | 6/2007 | | |
| JP | 2013-094717 | A | 5/2013 | | |
| JP | 2015-108213 | A | 6/2015 | | |
| JP | 2016-041858 | A | 3/2016 | | |
| JP | 2018-500467 | A | 1/2018 | | |
| JP | 2018-016904 | A | 2/2018 | | |
| JP | 2018-172804 | A | 11/2018 | | |
| JP | 2019-037963 | A | 3/2019 | | |
| JP | 2019-151692 | A | 9/2019 | | |
| JP | 2020-133041 | A | 8/2020 | | |
| JP | 6755067 | B1 | 9/2020 | | |
| JP | 2021-006337 | A | 1/2021 | | |
| TW | 201900968 | A | 1/2019 | | |
| TW | 201912205 | A | 4/2019 | | |
| WO | 2016/069342 | A1 | 5/2016 | | |
| WO | 2016/199883 | A1 | 12/2016 | | |
| WO | 2017/110943 | A1 | 6/2017 | | |
| WO | 2017/145993 | A1 | 8/2017 | | |
| WO | 2018/184930 | A1 | 10/2018 | | |
| WO | 2021/010178 | A1 | 1/2021 | | |
| WO | 2022/071076 | A1 | 4/2022 | | |

OTHER PUBLICATIONS

Dawn, Meltblown PP vs. Spunbond PP: Main Differences and Applications, Aug. 12, 2025.*

Iwasaki Hirobumi, Molded Filter, Jun. 29, 1992.*

International Search Report and Written Opinion mailed on Mar. 8, 2022, received for PCT Application PCT/JP2021/046344, filed on Dec. 15, 2021, 11 pages including English Translation.

Office Action issued on Jul. 15, 2025, in corresponding Chinese patent Application No. 202180092391.2, 18 pages.

Office Action issued on Sep. 26, 2025, in corresponding Chinese patent Application No. 202180092391.2, 15 pages.

Extended European search report issued on Nov. 14, 2024, in corresponding European patent Application No. 21923191.7, 8 pages.

Office Action issued on Feb. 10, 2026, in corresponding Chinese patent Application No. 202180092391.2, 14 pages.

\* cited by examiner

*FIG. 5*
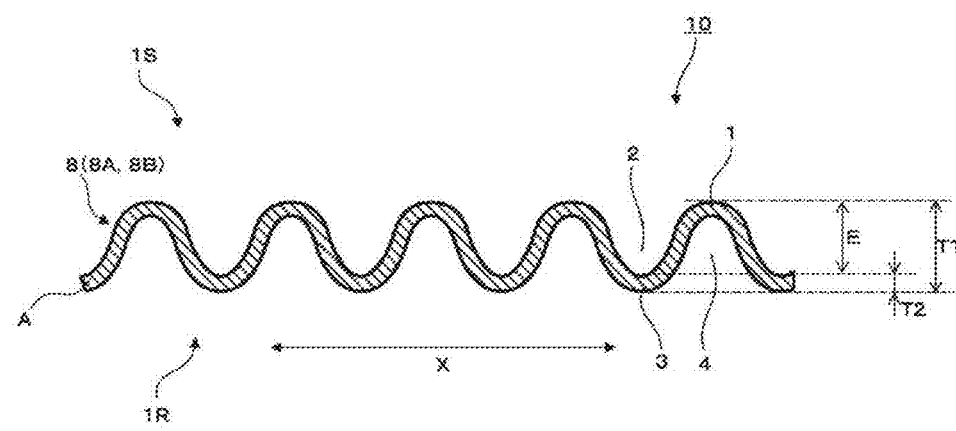
*FIG. 6(A)*
*FIG. 6(B)*
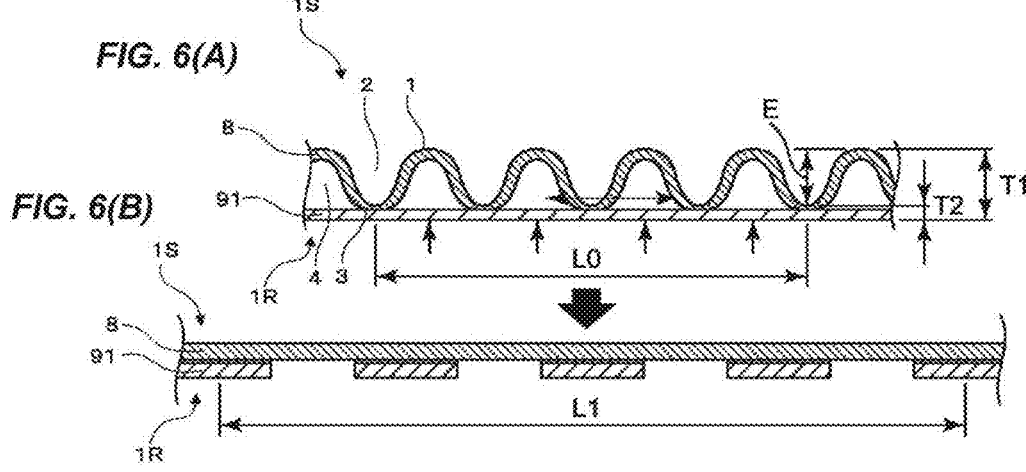
$$S1/S0 = L1/L0$$
*FIG. 7*
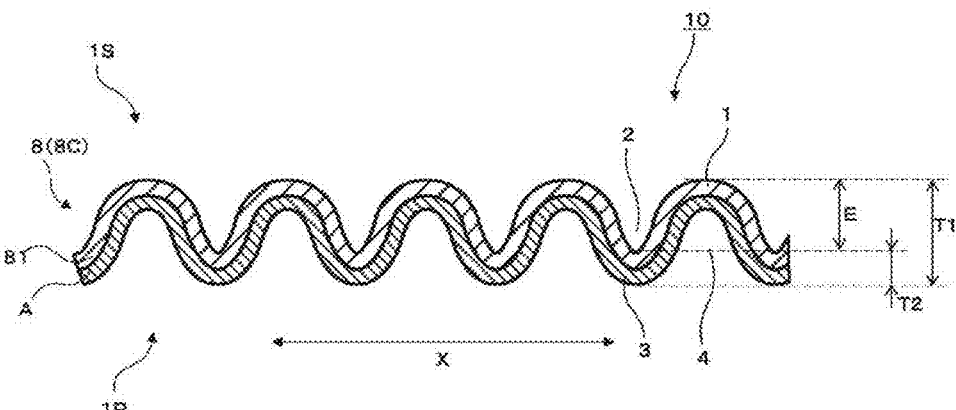

FIG. 12(A)
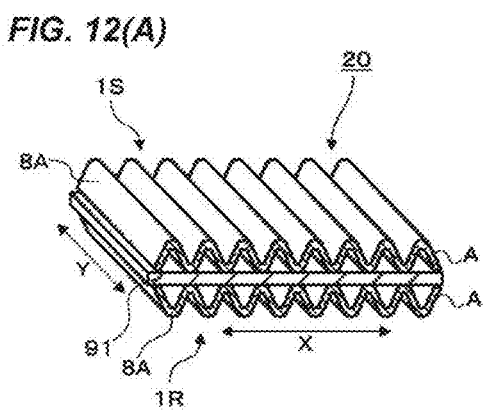
FIG. 12(B)
FIG. 12(C)
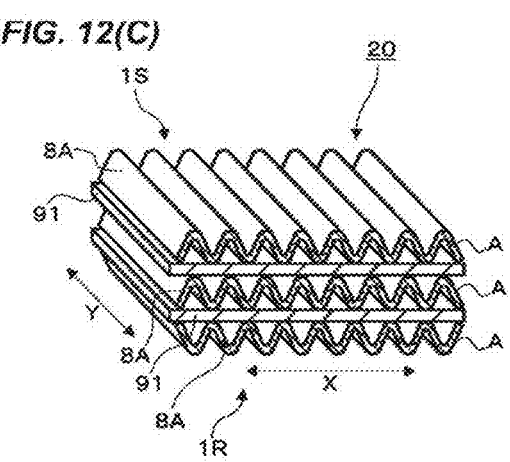
FIG. 13(A)
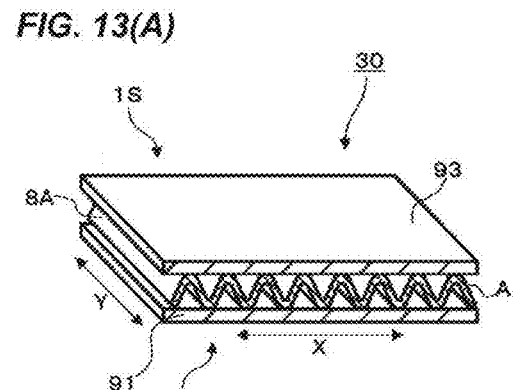
FIG. 13(B)
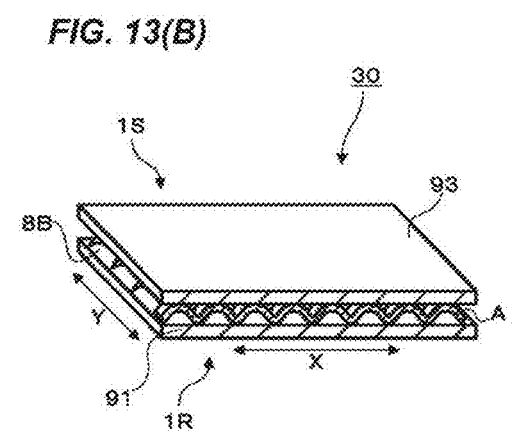

*FIG. 14(A)*
*FIG. 14(B)*
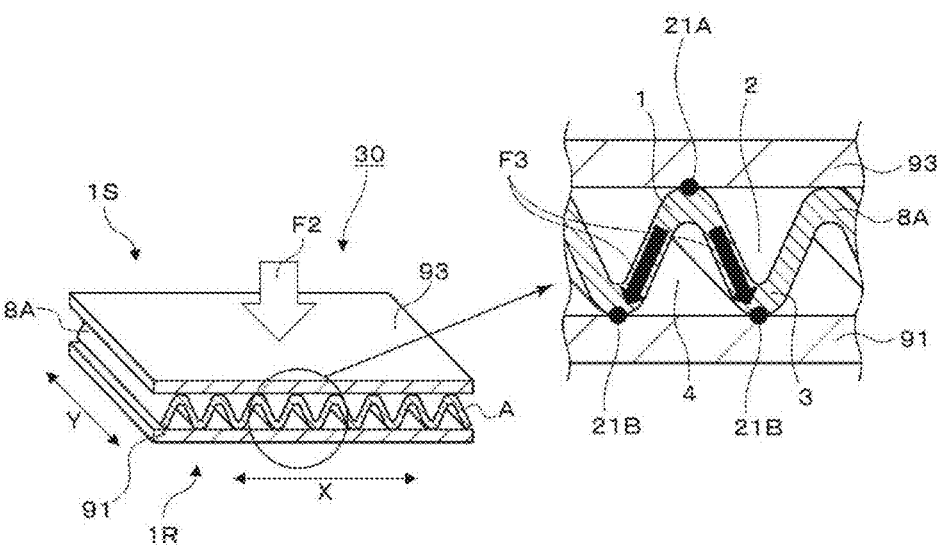
*Fig. 15(A)*
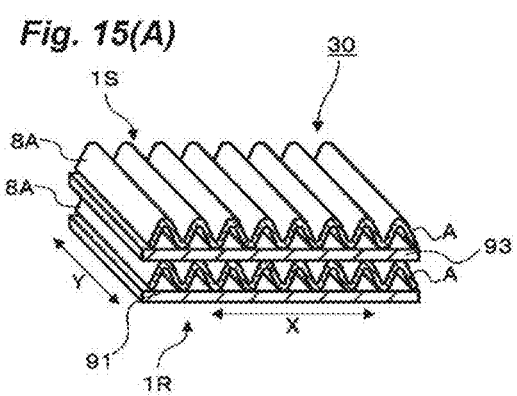
*FIG. 15(B)*
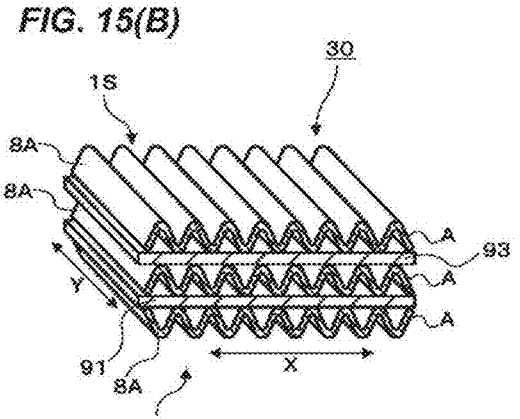
*FIG. 15(C)*
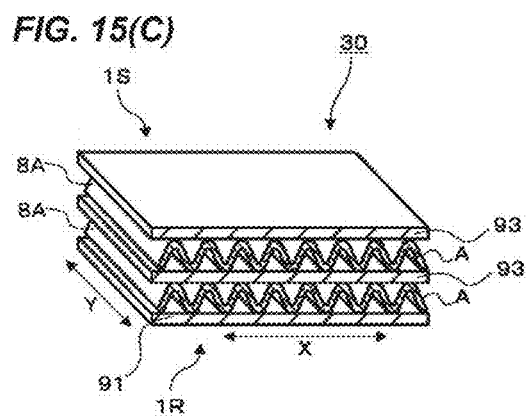

*FIG. 19(A)*          *FIG. 19(B)*
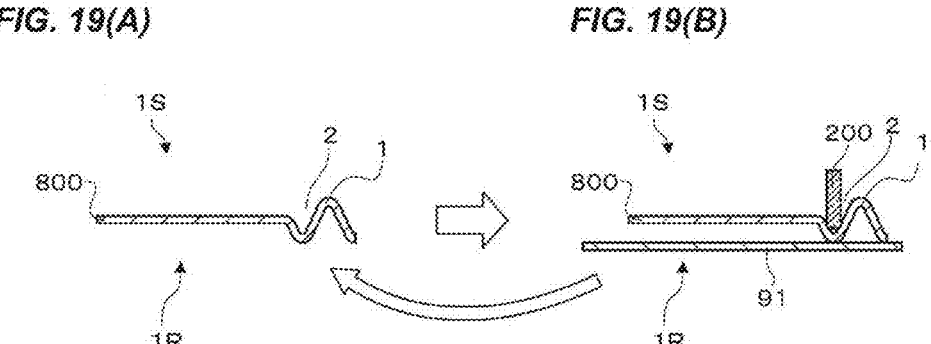
*FIG. 20(A)*
*FIG. 20(B)*          *FIG. 20(C)*
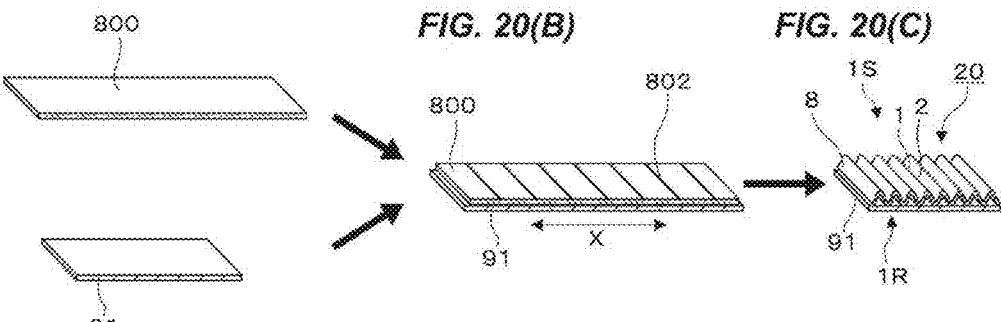

SANITARY MASK SHEET

CROSS-REFERENCE TO RELATED APPLICATIONS

The present application is based on PCT filing PCT/JP2021/046344, filed Dec. 15, 2021, which claims priority of Patent Application No. 2021-012296, filed in Japan on Jan. 28, 2021, each of which is herein incorporated by reference as part of the present specification.

FIELD OF THE INVENTION

The present invention relates to a sanitary mask sheet.

BACKGROUND OF THE INVENTION

A sanitary mask is a mask used to cover a person's mouth and nose in order to prevent invasion of outside airborne particles and the like (such as dust and dirt particles, pollen, viruses, droplets containing viruses and so on). Another purpose of the sanitary mask is to prevent dispersion of pathogen-containing droplets from the wearer's mouth and nose to the outside.

Various technologies have been proposed regarding this type of sanitary mask.

For example, Patent Literature 1 describes a non-woven mask that includes an outermost layer, an intermediate layer, and a mouth layer. The above-described intermediate layer includes a buffer layer comprising a specified fiber, and the compression characteristic WC of the non-woven mask is defined as 0.5 to 2.0 gf·cm/cm². The layers of the non-woven mask are mutually in close contact so as to provide a flat sheet structure as illustrated in FIG. 2 of the patent literature, and a technique of pleating in the contacted state is described.

Patent Literature 2 describes a virus removal filter in which an intermediate fiber layer is sandwiched between a first base material and a second base material formed by open cell foam sheets, and a mask using the same. The aforesaid three layers of the filter are integrated into planar shape. With regard to the aforesaid open cell foam sheet, a technology is described for increasing mask breathability by removing cell membranes from the open cell foam so as to adjust the number of cells to within a predetermined range.

Patent Literature 3 describes a mask body that features a corrugated filtering structure having valleys and peaks and includes elastic bridging filaments. A technique is disclosed for suppressing local deformation of the peaks by disposing the elastic bridging filaments so as to bridge a plurality of peaks of the corrugated filtering structure in the mask body.

Patent Literature 4 describes a mask having a non-woven sheet disposed inside a mask body made of a woven or knitted fabric as a mouth cover cloth. The sheet of non-woven fabric is provided with folds and used as partially secured to opposite ends of the mask body by a hook-and-loop fastener or the like. This makes the above-described non-woven sheet replaceable.

CITATION LIST

Patent Literatures

Patent Literature 1: WO 2016/199883
Patent Literature 2: JP-A-2018-16904 ("JP-A" means unexamined published Japanese patent application)

Patent Literature 3: JP-T-2018-500467 ("JP-T" means a published Japanese translation of PCT international application)
Patent Literature 4: JP-A-9-192247

SUMMARY OF THE INVENTION

The present invention provides a sanitary mask sheet with a WC value indicating a work volume up to a maximum pressure in a thickness direction (hereinafter referred to as a work of compression (WC)) of 0.3 Pa·m or more.

For the sanitary mask sheet, a capture rate of particles having a particle diameter of more than 1 μm is preferably 85% or more.

The present invention provides a sanitary mask sheet that includes one or more sheets.

The above-described sanitary mask sheet preferably has an average fiber diameter of 3000 nm or less.

The above-described sanitary mask sheet preferably includes a fiber layer having a density of 0.05 g/cm³ or more.

Preferably, one of the sheets included in the sanitary mask sheet has one surface and the other surface, and the one sheet is a projecting-and-depressed sheet with a plurality of projections projecting outward in a thickness direction and depressions between the plurality of projections at least on the one surface in the natural state of the sanitary mask sheet.

The present invention provides a method of using a sanitary mask sheet in which the above-described sanitary mask sheet is used as a filter sheet attachable to and detachable from a sanitary mask body of a sanitary mask.

Other and further objects, features and advantages of the invention will appear more fully from the following description, appropriately referring to the accompanying drawings.

BRIEF DESCRIPTION OF DRAWINGS

FIG. 5 is a cross-sectional view along an X-direction of the sanitary mask sheet of the first embodiment.

FIGS. 6(A) and 6(B) are explanatory views illustrating a method of measuring a ratio of a surface area of a projecting-and-depressed sheet per unit area in planar projection view of the sanitary mask sheet.

FIG. 7 is a cross-sectional view illustrating further another example of a sanitary mask sheet of a first embodiment.

FIG. 8 includes cross-sectional views along the X-direction illustrating examples of a sanitary mask sheet of a second embodiment.

FIG. 9 includes perspective views illustrating examples of a sanitary mask sheet of a second embodiment, FIG. 9(A)

illustrates an example of a laminated body of a projecting-and-depressed sheet including a fine fiber layer with an uneven structure illustrated in FIG. 3 and a base sheet.

FIGS. 12(A) to 12(C) are perspective views illustrating modifications of the lamination form of sheets in the sanitary mask sheet of the second embodiment.

FIG. 13 includes perspective views illustrating examples of a sanitary mask sheet of a third embodiment, FIG. 13(A) illustrates an example of a laminated body of a projecting-and-depressed sheet including a fine fiber layer with an uneven structure illustrated in FIG. 3, a base sheet, and a cover sheet, and FIG. 13(B) illustrates an example of a laminated body of a projecting-and-depressed sheet including a fine fiber layer with an uneven structure illustrated in FIG. 4, a base sheet, and a cover sheet.

FIG. 14(A) is an explanatory view illustrating a state of applying a compressive load to the sanitary mask sheet of the third embodiment, and FIG. 14(B) is an explanatory view schematically illustrating a route of propagation of the compressive load in the state of FIG. 14(A).

FIGS. 15(A) to 15(C) are perspective views illustrating modifications of the lamination form of sheets in the sanitary mask sheet of the third embodiment.

FIG. 17 is an explanatory view illustrating an example of a method of producing the sanitary mask sheet of the second embodiment.

FIG. 18 is an explanatory view illustrating another example of a method of producing the sanitary mask sheet of the second embodiment.

FIG. 19 is an explanatory view illustrating further another example of a method of producing the sanitary mask sheet of the second embodiment.

FIG. 20 is an explanatory view illustrating further another example of a method of producing the sanitary mask sheet of the second embodiment.

DESCRIPTION OF EMBODIMENTS

Figure 1:
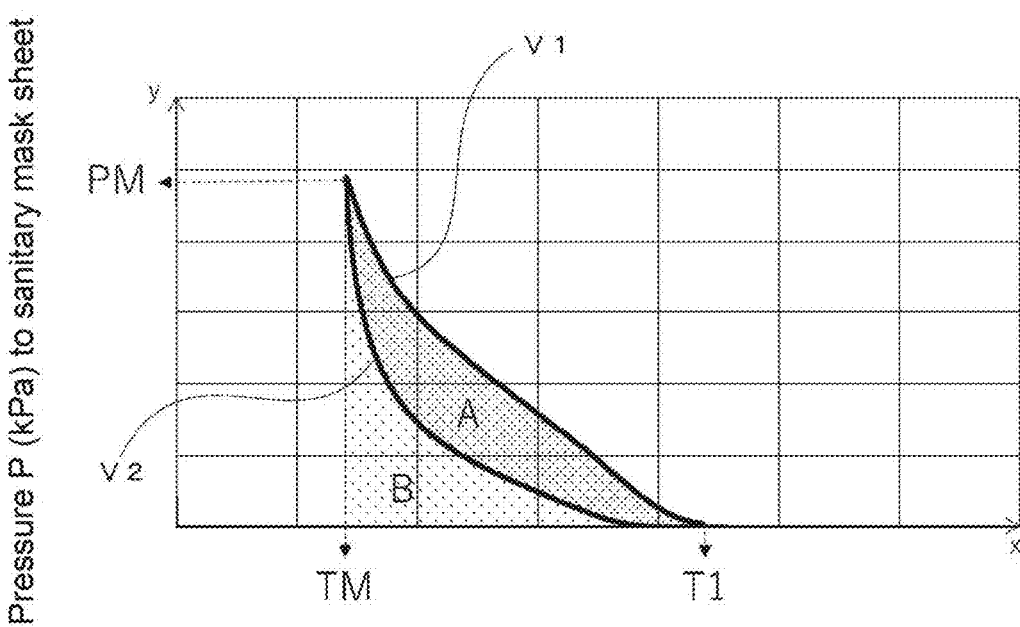
FIG. 1 is a graph illustrating a relation between a thickness of a sanitary mask sheet of the present invention and a pressure applied to the sanitary mask sheet.

In consideration of the above-described points, the present invention relates to a sanitary mask sheet providing both of a high capture efficiency to particles and the like in the air and a soft touch.

Some sanitary masks are made of a sheet-shaped material such as a non-woven fabric. A non-woven fabric is generally more finely textured than woven cloth, and has a high capture efficiency (filterability) of particles and the like. In particular, a non-woven fabric obtained by a meltblown process (hereinafter sometimes also referred to as a melt-blown non-woven fabric) is made of fibers of micrometer order and is excellent in capture efficiency.

While non-woven fabric is excellent in capture efficiency, its fiber density and hardness are higher than those of woven cloth, thus there is a leaving room for fabric feel improvement. Conventionally, therefore, it has been difficult to impart both desired particle capture efficiency and fabric feel to sanitary mask sheet using non-woven fabric. The above-mentioned Patent Literatures 1 to 4 do not describe methods for achieving both.

Additionally, while a mask made of urethane foam includes open cell sponge and is soft and comfortable to wear, the large cell diameter decreases capture efficiency. Moreover, the high-capture-efficiency, so-called dust-proof mask is three-dimensionally shaped and rigid, making it hard and uncomfortable to wear. Thus, it has also been difficult to provide a mask made of a material other than non-woven fabric with both desired particle and the like capture efficiency and fabric feel.

In contrast, the sanitary mask sheet of the present invention is capable of providing both of the high capture efficiency to particles and the like in the air and the soft touch.

In this description, where a numerical limit or range is stated herein, the endpoints are included. Also, all values and subranges within a numerical limit or range are specifically included as if explicitly written out.

Obviously, numerous modifications and variations of the present invention are possible in light of the above and following teachings. It is therefore to be understood that, within the scope of the appended claims, the invention may be practiced otherwise than as specifically described herein.

All patents and other references mentioned above and below are incorporated in full herein by this reference, the same as if set forth at length.

The following describes the present invention based on preferred embodiments. The present invention relates to a sheet material used for a sanitary mask (hereinafter referred to as a sanitary mask sheet). In this description, the "sanitary mask" is an article worn on a face of a person for respiration to filter air before inhaled into respiratory organs of the person and to filter droplets in breaths of the person before discharged outside. Therefore, the sanitary mask sheet according to the present invention preferably has dimensions and a shape at least enough to cover a mouth and a nose of a person.

For the sanitary mask sheet of the present invention, a work of compression (WC) in a thickness direction is preferably 0.3 Pa·m or more. For the sanitary mask sheet of the present invention, a capture rate of particles having a particle diameter of more than 1 μm is preferably 85% or more. The sanitary mask sheet of the present invention as described above preferably contains a fiber material, a foamed sheet material, a porous sheet material, or both materials as main components. The main component means a constituent material of a maximum content.

In the sanitary mask sheet of the present invention, since the work of compression (WC) in the thickness direction of the entire sheet is 0.3 Pa·m or more, a deformability in the thickness direction is appropriately provided and a hardness is reduced, thus providing a soft touch. From this point of view, the work of compression (WC) in the thickness direction of the entire sheet is more preferably 1.5 Pa·m or more, and further preferably 2.5 Pa·m or more.

Moreover, the work of compression (WC) in the thickness direction of the sanitary mask sheet according to the present invention is preferably 20 Pa·m or less, more preferably 15 Pa·m or less, further preferably 6.5 Pa·m or less, and furthermore preferably 3.5 Pa·m or less. With this upper limit or less, the sanitary mask sheet of the present invention has the above-described appropriate work of compression, and appropriately follows the shape of the skin, thereby allowing reducing a gap between the sanitary mask sheet and the skin.

By appropriately suppressing the work of compression in the thickness direction of the entire sheet, the softness of the touch when worn on the face and the thickness and the elasticity necessary therefor can be held.

In the sanitary mask sheet of the present invention, since an LC value indicating a linearity between a pressure and a thickness in the thickness direction of the entire sheet (hereinafter referred to as a linearity of compression (LC)) is 0.5 or more, the compression property is less likely to change even when a deformation occurs in the thickness direction, and the touch is kept. From this point of view, the linearity of compression (LC) in the thickness direction of the entire sheet is preferably 0.6 or more, and more preferably 0.65 or more.

The linearity of compression (LC) in the thickness direction of the sanitary mask sheet of the present invention is realistically 1 or less, more realistically 0.9 or less, and further realistically 0.85 or less.

With the above-described both properties of the work of compression (WC) and the linearity of compression (LC), the sanitary mask sheet of the present invention can form the sanitary mask that is provided with the further high softness and can more keep the softness even when being deformed in the compression direction.

In addition, since the capture rate of particles having the particle diameter of more than 1 μm is 85% or more, the sanitary mask sheet of the present invention can effectively suppress inhaling dust, dirt, pollen, virus, droplets containing virus, and the like by a person. At the same time, with the above-described high capture rate, the sanitary mask sheet of the present invention can effectively suppress a proportion of spreading of the droplets and the like in the person's breath to the outside. From the aspect of more enhancing the above-described effect, the above-described capture rate is preferably 88% or more, and more preferably 90% or more.

The above-described capture rate of particles indicates that the higher the value is, the higher the capture performance is, and the capture rate of particles is realistically 100% or less.

With the above-described capture rate, the sanitary mask sheet of the present invention is provided with the high deformability in the thickness direction by the above-described compression property in the thickness direction even when the sheet material (for example, fiber material, foamed sheet material, porous sheet material) includes a dense layer, thus providing the soft touch. Accordingly, the sanitary mask sheet of the present invention provides both the high capture efficiency to particles and the like and the soft touch.

The work of compression (WC) and the linearity of compression (LC) in the above-described thickness direction, and the capture rate of particles having the particle diameter of more than 1 μm of the sanitary mask sheet of the present invention can be measured by the methods below.

(Method for Measuring Work of Compression (WC) and Linearity of Compression (LC) in Thickness Direction)

In the present invention, the work of compression (WC) and the linearity of compression (LC) can be measured by the following methods. The measurement is performed at 23° C. and the relative humidity of 50%. As a measuring apparatus, KES-G5 compression tester manufactured by KATO TECH CO., LTD. is used. The sanitary mask sheet left to stand in its natural state is evaluated under the condition of a pressure plate area of 2.0 cm$^2$, a compressive deformation rate of 0.02 mm/second, and a maximum compressive load of 4.9 kN.

FIG. 1 illustrates a graph for calculating the work of compression (WC) and the linearity of compression (LC). A y-axis direction (vertical axis direction) in the drawing indicates a pressure P (gf/cm$^2$) to the sanitary mask sheet, and an x-axis direction (horizontal axis direction) in the drawing indicates a thickness T (mm) of the sanitary mask sheet. T1 on the x-axis in the drawing indicates the thickness of the sanitary mask sheet when the pressure P is 0, and TM on the x-axis in the drawing indicates the thickness of the sanitary mask sheet when the pressure P is 4.9 kN as the maximum compressive load (PM). As the graph illustrated in FIG. 1, the relation between the thickness of the sanitary mask sheet and the pressure to the sanitary mask sheet changes as follows. That is, in the graph illustrated in FIG. 1, for (x-axis coordinate, y-axis coordinate), the pressure is applied from (T1, 0), and the coordinate reaches (TM, PM) along a curved line V1. Then, by reducing the pressure, the coordinate returns to (T1, 0) along a curved line V2. The work of compression (WC) is calculated as an integral value of the pressure P in T from T1 to TM, that is, an area of A+B in the drawing. The linearity of compression (LC) is calculated with a formula below.

$$\text{Linearity of compression } (LC) = 2 \times (\text{work of compression } (WC))/(T1-TM)/PM$$

(Method for Measuring Capture Rate of Particles Having Particle Diameter of More than 1 μm (Microparticles))

Figures 2A, 2B, 2C:
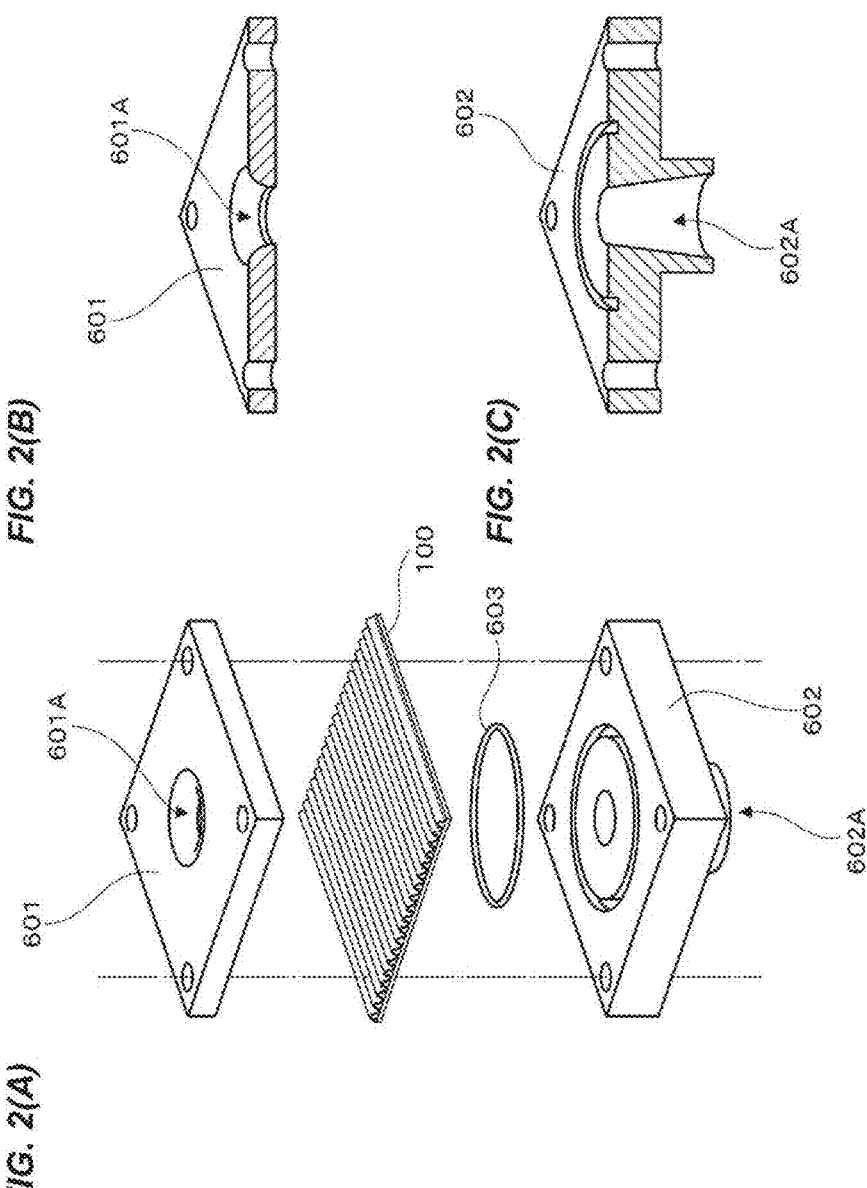
FIG. 2(A) is an exploded perspective view illustrating a device for measuring a particle capture rate.
FIGS. 2(B) and 2(C) are cross-sectional perspective views illustrating an upper jig and a lower jig of the device illustrated in FIG. 2(A).

A handheld airborne particle counter ("MET ONE HHPC6+" manufactured by Beckman Coulter, Inc.) is used, and a sheet as an evaluation target is fixed so as to cover a measurement terminal of the counter with the sheet. At this time, it is necessary to cover the measurement terminal by bringing the sheet in close contact so as to avoid leakage of the air from the gap, and the measurement is performed using a dedicated jig as illustrated in FIGS. 2(A) to 2(C). The jig illustrated in the drawings includes a jig 601 and a jig 602. A rubber seal 603 is disposed between the jig 601 and the jig 602, and a sheet 100 as a measurement target is placed between the rubber seal 603 and the jig 601. The jig 601 is provided with a suction port 601A for the air in the center. The suction port 601A has a diameter the same as the measurement terminal, and is a through hole penetrating from the upper surface to the lower surface of the jig 601. The jig 602 is provided with an insertion port 602A for the measurement terminal in the center. The insertion port 602A of the measurement terminal is a through hole penetrating from the lower surface to the upper surface of the jig 602.

Using the jigs 601 and 602, a particle count P1 passing through the sheet is measured for particles (particle diameter 1.0 μm or more) in the atmosphere at 25° C. and RH 50%. Besides this, a particle count P2 is measured without the sheet. From the measured particle counts P1 and P2, the capture rate (%) of microparticles is calculated based on a formula below. It is meant that the higher the value of the capture rate of microparticles is, the higher the capture performance to microparticles of the mask sheet is. The size of the sheet used for the measurement is 40 mm×40 mm, the capture rate is measured for each of 10 sheets, and an average value of the measurement values is used as the capture rate.

$$\text{Capture rate (\%) of microparticles}=100\times(P2-P1)/P2$$

When the sanitary mask sheet of the present invention has a laminated structure of a plurality of layers as described later, the capture rate of each fiber layer only needs to be measured by peeling off the fiber layers from one another. Depending on the joining state of the fiber layers, the delamination is not successful in some cases. For example, in a configuration in which the fiber layers are mutually thermal fusion bonded, a fiber layer with low strength is pulled by a fiber layer with high strength at a joint portion in the delamination, and this causes holes in the fiber layer with low strength. In such a case, a capture rate H1(%) of the fiber layer with high strength after the delamination and a capture rate H (%) of the sanitary mask sheet in the composite state before the delamination are measured, and a capture rate H2 of the fiber layer with low strength is calculated based on a formula below.

$$H2 \ (\%) = \left\{1 - (100 - H)/(100 - H1)\right\} \times 100$$

When the fiber layers are mutually bonded by a hot-melt agent or the like, the fiber layers are peeled off by making the hot-melt agent brittle by a commercially available cooling spray. When the sanitary mask sheet includes the fiber layers of three or more layers, the same applies to the delamination of these fiber layers.

This delamination method is common to other measuring methods in this description.

The sanitary mask sheet of the present invention has the above-described properties, and preferably includes a sheet-shaped fiber layer with a fiber network structure, a sheet-shaped soft porous layer like a sponge using a foamed sheet material, or a combination thereof. The sanitary mask sheet of the present invention may include a single layer, and may include a plurality of layers.

The fiber network structure in the above-described fiber layer is formed by entanglement or joining of fibers, or a combination thereof, thereby keeping the shape as the layer. In the fiber layer, passing through of the particles can be inhibited by shortening a distance between fibers, and the above-described capture rate can be improved by complicating the passage of the particles. A typical example of the fiber layer is a sheet-shaped non-woven fabric.

When the sanitary mask sheet of the present invention includes the above-described fiber layer that improves the capture rate, it is advantageous for the fiber layer, for example, to thin the thickness of the fiber and shorten the distance between fibers thereby.

For achieving the above-described properties of the capture rate, the work of compression (WC), and the linearity of compression (LC), the sanitary mask sheet of the present invention preferably includes a fiber layer having an average fiber diameter of 3000 nm or less (hereinafter also referred to as a fine fiber layer A).

The fine fiber layer A is a filtration layer having interstices between fibers (separation distance) of nanometer order in the fiber network structure. This allows the sanitary mask sheet of the present invention to achieve the high capture efficiency. For example, pollens and droplets generally having the particle diameter of 3 μm or more and 5 μm or less, and further particles and the like having smaller particle diameter can be more effectively captured. The fine fiber layer A made of an ultrafine fiber of nanometer order allows making the interstices between fibers smaller, thereby allowing achieving the thinner sanitary mask sheet with high capture efficiency. The sanitary mask sheet with the thinner thickness provides easy breath and high flexibility, and this is advantageous in the softness of the touch and the improvement of the wearing comfort when the sanitary mask sheet of the present invention is worn on the face.

From this point of view, the average fiber diameter of the fine fiber layer A is more preferably 2000 nm or less, further preferably 1000 nm or less, and furthermore preferably 900 μm or less.

From the aspect of appropriately ensuring the air permeability to make respiration easy for the user of the sanitary mask sheet, the average fiber diameter of the fine fiber layer A is preferably 50 nm or more, more preferably 100 nm or more, further preferably 200 nm or more, and especially preferably 250 μm or more.

The fine fiber layer A preferably has the density of 0.05 g/cm$^3$ or more. This allows the sanitary mask sheet of the present invention to more effectively capture pollens and droplets, and further particles and the like having the smaller particle diameters than those, and allows improving the strength of the fine fiber layer A.

From this point of view, the density of the fine fiber layer A is more preferably 0.1 g/cm$^3$ or more, further preferably 0.15 g/cm$^3$ or more, and furthermore preferably more than 0.2 g/cm$^3$.

From the aspect of appropriately ensuring the air permeability to make respiration easy for the user of the sanitary mask sheet, reduction of compressive elasticity, and achievement of soft touch, the density of the fine fiber layer A is preferably 0.6 g/cm$^3$ or less, more preferably 0.55 g/cm$^3$ or less, further preferably 0.5 g/cm$^3$ or less, and especially preferably 0.4 g/cm$^3$ or less.

The average fiber diameter and the density of the fine fiber layer A can be measured by the methods below.

(Average Fiber Diameter of Fine Fiber Layer A)

For the average fiber diameter of the fine fiber layer A, a maximum length across a fiber cross-sectional surface perpendicular to a fiber length direction can be measured using a scanning electron microscope (SEM). The specific procedure is as follows.

The sanitary mask sheet is carefully peeled off to confirm how many layers are included, and then, a layer with the thinnest fiber diameter (layer that functions as a filtration material) is determined as the measurement-target fiber layer. In the two-dimensional image of the SEM observation, any 500 fibers are selected excluding defects such as a clump of fibers, an intersecting portion of fibers, and a polymer droplet, and lengths of lines perpendicular to the longitudinal directions of the fibers are directly read as the fiber diameter. A median fiber diameter in which the cumulative frequency is 50% of the whole is obtained from a frequency distribution (histogram) of the measured fiber diameters, and the median fiber diameter is determined as the average fiber diameter of the fibers constituting the measurement-target fiber layer.

(Method for Measuring Density of Fine Fiber Layer A)

The density of the fine fiber layer A can be measured by the method below. First, a non-woven fabric structure is left to stand in its natural state without an external force, and the non-woven fabric structure is cut using a single edge blade (product number FAS-10) manufactured by FEATHER SAFETY RAZOR CO., Ltd. to form a cross section of the non-woven fabric structure.

Subsequently, a scanning electron microscope (model number JCM-5100) manufactured by JEOL Ltd. and a microscope or the like are used to enlarge and observe the cut out cross section. With image data or a printed matter of the enlarged and observed cross section, the thickness of the fine fiber layer A without load is measured. Fuzzy fibers inevitably present on the surface of the non-woven fabric structure are excluded from the measurement target. The thickness of the non-woven fabric structure is an average value of the thicknesses in the image enlarged and observed by the above-described method. When the fine fiber layer A has an uneven structure as illustrated in FIGS. 3 to 8 and the like described below, the above-described "thickness of the fine fiber layer A" means not a height of undulation of the unevenness (apparent thickness in the thickness direction between a first surface 1S side and a second surface 1R side of the fine fiber layer A), but a thickness of the fiber layer itself along the undulation of the unevenness.

Then, the non-woven fabric structure left to stand in its natural state is cut in a predetermined area (for example, 2 cm×2 cm), the fiber layers other than the fine fiber layer A are removed, the mass and the surface area of the fine fiber layer A are measured, and the basis weight is calculated by dividing the mass by the area. Then, the basis weight is divided by the thickness to calculate the density. When the fine fiber layer A has the uneven structure, the above-described "predetermined area" in the cutting means an area along the undulation of the unevenness (or an area in a state where the unevenness is flattened). The "surface area" of the fine fiber layer A means a surface area S1 of the unevenness measured by a method described in (Method for measuring ratio of S1 to S0) below.

The fine fiber layer A preferably has the basis weight of a certain level or more from the aspect of enhancing the above-described capture rate. From the aspect of enhancing the above-described capture rate and providing uniform filtration performance, the basis weight of the fine fiber layer A is preferably 2 g/m² or more, more preferably 2.5 g/m² or more, and further preferably 3 g/m² or more.

From the aspect of reducing the air flow resistance, reducing the rigidity and improving the use feeling by thinning the sheet, and also reducing the cost, the basis weight of the fine fiber layer A is preferably 15 g/m² or less, more preferably 10 g/m² or less, and further preferably 5 g/m² or less.

With the basis weight of the fine fiber layer A in these ranges, the high capture performance to particles and the like and the soft touch can be stably developed, and the excellent air permeability and the improved use feeling caused by reducing the thickness can be achieved.

The basis weight of the fine fiber layer A is calculated by the above-described (Method for measuring density of fine fiber layer A).

The fine fiber layer A is preferably a fiber layer produced by electrospinning method (hereinafter, such a fine fiber layer A is also referred to as an electrospinning fiber layer). In the electrospinning method, a solution or a molten solution of a resin with fiber forming ability is electrically charged and discharged into an electric field, a fiber is formed by extending the discharged liquid by the electric field, and the fiber is accumulated on a collecting body, thereby allowing the production of the fine fiber layer A.

In this producing method, by extending the discharged solution or molten solution of the resin by a Coulomb force in the electric field, an ultrafine fiber of nanometer order that cannot be achieved by conventional extending by air or the like is obtained. In this respect, in the conventional producing method of non-woven fabric, for example, the melt-blown method, the discharged molten resin is extended by spraying a high temperature gas to form the fiber, it is difficult to obtain a fiber like the fine fiber layer A in the present invention, and mainly the fiber of micrometer order is obtained at most.

Accordingly, the fine fiber layer A is an aggregation layer of an incommensurable ultrafine fiber of nanometer order that is provided by the electrospinning method and cannot be provided by the conventional meltblown method.

The component of the fiber constituting the fine fiber layer A is preferably a thermoplastic resin having a melting point of 80° C. or more and 200° C. or less. Examples thereof include polyester-based resin, polyolefin-based resin, polyamide-based resin, polyimide based resin, fluorine-based resin, acrylic-based resin, styrene-based resin, urethane-based resin, vinyl-based resin, aromatic polyether ketone-based resin, nitrile-based resin, polycarbonate resin, and natural resin. Especially, from the aspect of successfully forming nanofiber, the polyester-based resin and the poly-olefin-based resin are preferred.

While the electrospinning fiber layer has the density necessary for the above-described high capture efficiency to particles and the like, the density is appropriately reduced compared with a non-woven fabric produced by the melt-blown method (hereinafter also referred to as a meltblown non-woven fabric), thus the further excellent flexibility is provided. This is caused by the difference in both methods. In the electrospinning method, since the fiber is stretched by drawing with the power of electricity, continuous fibers are formed without breaking of fiber compared with drawing by spraying the high temperature gas in the meltblown method. For the solution discharged by the Coulomb force in the electric field, the solvent is instantly vaporized with the drawing of the solution, and the nanofibers are formed while the raw material solidifies. Therefore, the continuous fibers are often not mutually fusion bonded in the electrospinning fiber layer, and since the electrospinning fiber layer is formed by entangling of the fibers, the high flexibility is obtained without mutually hindering the moves of the fibers. In contrast, in the non-woven fabric produced by the melt-blown method (hereinafter also referred to as a meltblown non-woven fabric), the fibers are broken by spraying the high temperature gas and the fibers remained to be molten are laminated and fusion bonded. Therefore, in the melt-blown non-woven fabric, since the bulk in the thickness direction is collapsed and the moves of the fibers are mutually hindered compared with the electrospinning fiber layer, the rigidity becomes relatively high.

Thus, the electrospinning fiber layer is different from the meltblown non-woven fabric in the state of fiber, easily becomes relatively bulky, and is further excellent in flexibility.

The sanitary mask sheet of the present invention including the fine fiber layer A provides further soft touch while keeping the above-described high capture efficiency.

While the sanitary mask sheet of the present invention may include the above-described fine fiber layer A alone, from the aspect of ensuring the strength of the entire sanitary mask sheet, the above-described fine fiber layer A is preferably combined with another sheet.

As the other sheet, those of various kinds of materials can be used, for example, a fiber sheet of a non-woven fabric or the like may be used, and a foam sheet made of a polyurethane material or the like; or a porous sheet with multiple voids in a sheet made of a polyolefin material, a polyester material, or the like may be used. The other sheet may be one in which a plurality of kinds of sheets are combined. The fine fiber layer A may be interposed between the other sheets.

When the other sheet is a non-woven fabric, for the non-woven fabric, various kinds of non-woven fabrics can be used insofar as the above-described properties of the sanitary mask sheet of the present invention are not impaired. Examples include the above-described meltblown non-woven fabric, an electrospinning non-woven fabric, a non-woven fabric obtained by spunbond method (spunbonded non-woven fabric), a non-woven fabric produced by air-through method (air-through non-woven fabric), a non-woven fabric produced by spunlace method (spunlace non-woven fabric), or a non-woven fabric produced by needlepunching (needlepunched non-woven fabric), a laminated body of two or more kinds of non-woven fabrics among these non-woven fabrics, a laminated body of these non-woven fabrics and another non-woven fabric or another material, or the like. Among them, the spunbonded non-woven fabric, the needlepunched non-woven fabric, or the like is preferable. Because of the high strength and the high cushioning characteristic compared with the other kinds of the non-woven fabrics, the spunbonded non-woven fabric and the needlepunched non-woven fabric appropriately function as a protecting material of the sanitary mask sheet of the present invention. The above-described non-woven fabric may include an elastic body as described below.

For the resins constituting these non-woven fabrics, insofar as the fiber forming ability is provided, the type is not especially limited. For example, a polyolefin resin, a polyester resin, a urethane resin, or the like can be used. From the aspect of forming joint points 21 described below, and the aspect of forming a joint portion 5M described below, a thermoplastic fiber is preferred to be included.

When the sanitary mask sheet of the present invention includes the above-described fine fiber layer A and the other sheet, and the other sheet is made of a fiber such as a non-woven fabric, it is preferred that the average fiber diameter of the fine fiber layer A is the thinnest among the sheets constituting the sanitary mask sheet of the present invention.

This allows assigning the functions to the fine fiber layer A as the filtration layer in the sanitary mask sheet of the present invention and the other sheet as the protecting material enhancing the strength of the sanitary mask sheet of the present invention. The other sheet can also serve the function as an elastic layer providing the work of compression (WC) and the linearity of compression (LC) in the thickness direction. This allows more effectively achieving the above-described properties as the entire sanitary mask sheet. In addition, an unintended damage of the fine fiber layer A can be avoided, and the capture efficiency can be kept.

Due to the difference of the above-described average fiber diameter, the sanitary mask sheet of the present invention achieves the above-described high capture rate by the fine fiber layer A while increasing the air permeability by the other sheet, thus allowing stuffiness reduction and easy respiration. For the air permeability and the above-described capture rate, the sanitary mask sheet of the present invention is preferred to include a projecting-and-depressed sheet described later. The above-described projecting-and-depressed sheet may include the fine fiber layer A, and may include the above-described other sheet. For the air permeability and the above-described capture rate, the above-described projecting-and-depressed sheet is preferred to meet a requirement of a ratio of an unevenness surface area S1 per unit area S0 in planar projection view described below.

From the above-described aspect, a ratio (Q2/Q1) of an average fiber diameter (Q2) of the other sheet to an average fiber diameter (Q1) of the fine fiber layer A is Q1<Q2, preferably 5 or more, and more preferably 25 or more.

Realistically, the ratio (Q2/Q1) of the average fiber diameter (Q2) of the other sheet to the average fiber diameter (Q1) of the fine fiber layer A is Q1<Q2, and 50 or less.

When the sanitary mask sheet of the present invention includes the above-described fine fiber layer A and the other sheet, and the other sheet is made of a fiber such as a non-woven fabric, it is preferred that the density of the fine fiber layer A is the highest among the sheets constituting the sanitary mask sheet of the present invention. This allows improving the particle capture performance of the fine fiber layer A and improving the air permeability of the other sheet, and as the sanitary mask sheet, the improvement of the capture efficiency and the suppression of the air permeability reduction can be performed at the same time.

The fine fiber layer A that functions as the filtration layer is distinguished from the other sheet that functions as the protecting material in the capture rate of particle having the particle diameter of more than 1 μm and/or the average fiber diameter. In this description, all of a protection sheet, a base sheet, and a cover sheet described later are protecting materials.

For the above-described capture rate, the fine fiber layer A is set to be higher than the other sheet. When the above-described capture rate of the other sheet is C1(%), and the above-described capture rate of the fine fiber layer A is C2(%), the above-described capture rate C of the sanitary mask sheet of the present invention is calculated by a formula below.

$$C\ (\%) = \{1 - (1 - C1/100) \times (1 - C2/100)\} \times 100$$

The C1 value is preferably 50% or less, and the C2 value is preferably 70% or less. That is, it is preferred from the point of allowing the clear distinction of the functions served by the fine fiber layer A and the other sheet that the capture rates of both layers are different to the extent that the value of C1/C2 preferably becomes 0 or more and 0.7 or less.

The C value is preferably 85% or more, further preferably 88% or more, and furthermore preferably 90% or more, and preferably 100% or less. The measuring method of the particle capture rate is as described above.

Next, preferred embodiments of the sanitary mask sheet of the present invention will be described.

It is preferred that the sanitary mask sheet of the present invention includes one or more sheets, and one of the sheets included in the sanitary mask sheet has one surface and the other surface. It is preferred that the one sheet is a projecting-and-depressed sheet with a plurality of projections projecting outward in a thickness direction and depressions between the plurality of projections at least on the one surface in the natural state of the sanitary mask sheet. Furthermore, the above-described fine fiber layer A is preferred to be included.

Here, the "natural state" means a state where the sanitary mask sheet of the present invention is left to stand with the open sheet surface without applying an elongation force. The above-described one surface and other surface mean front and back surfaces of the projecting-and-depressed sheet. Hereinafter, in this description, the one surface is referred to as a first surface, and the other surface is referred to as a second surface.

When the sanitary mask sheet of the present invention includes the fine fiber layer A, the above-described projecting-and-depressed sheet may be a different member from the fine fiber layer A (for example, the above-described non-woven fabric described as the protecting material for the fine fiber layer A), and may include the fine fiber layer A. The fine fiber layer A itself may be the above-described projecting-and-depressed sheet. When the above-described projecting-and-depressed sheet does not include the fine fiber layer A, the fine fiber layer A may have a flat shape, and may have an uneven shape.

The above-described projecting-and-depressed sheet is preferably a fiber sheet including the fiber network structure, and more preferably a sheet including the above-described non-woven fabric. Such a projecting-and-depressed sheet can more improve the work of compression (WC) of the sanitary mask sheet of the present invention, and can contribute to the improvement of soft touch.

From this aspect, it is preferred that a plurality of the above-described projections and depressions are regularly and alternately disposed over a certain region or the whole surface of the above-described projecting-and-depressed sheet.

The sanitary mask sheet of the present invention may include the above-described projecting-and-depressed sheet, and the projecting-and-depressed sheet may include the protection sheet. When the protection sheet is a non-woven fabric, a bending resistance of the protection sheet is preferably 20 mm or more, more preferably 25 mm or more, further preferably 30 mm or more. This allows the protection sheet having the uneven shape to keep the strength for protecting the fine fiber layer A.

Moreover, the bending resistance of the protection sheet is preferably 150 mm or less, more preferably 100 mm or less, and further preferably 70 mm or less. This allows holding the cushioning characteristic and the soft touch of the protection sheet having the uneven shape. In addition, with the uneven shape less likely to collapse, the ratio of the unevenness surface area S1 per unit area S0 in planar projection view described below is kept, an air flow resistance is reduced, and thus a sanitary mask easy to breathe can be provided.

Since the above-described non-woven fabric constituting the above-described projecting-and-depressed sheet has the bending resistance in the above-described range, the work of compression (WC) in the above-described thickness direction of the sanitary mask sheet of the present invention can be more appropriately achieved.

From the aspect similar to the above description, it is preferred that the sanitary mask sheet of the present invention includes the projecting-and-depressed sheet including the above-described non-woven fabric, the height and a distance between centers of the projections of the projecting-and-depressed sheet are set in predetermined ranges described below, and the sanitary mask sheet of the present invention includes the fine fiber layer A. This allows more appropriately achieving the work of compression (WC) and the linearity of compression (LC) in the above-described thickness direction, and the capture rate of particles having the particle diameter of more than 1 μm in the sanitary mask sheet of the present invention.

(Method for Measuring Bending Resistance)

A measurement sample having widths of 20 mm in the long side direction and the short side direction of the sanitary mask is cut out from the sanitary mask sheet. The sheet as the measurement target is carefully peeled off from other sheets so as not to damage the measurement-target sheet. When the measurement-target sheet and the other sheets are joined, fibers of the other sheets are removed using an edged tool or the like until the bending resistance of the measurement-target sheet is no longer affected. Then, the measurement-target sheet is left to stand at 23° C. and relative humidity of 50% for 24 hours or more. Then, the bending resistance is measured in accordance with the method A (45° cantilever method) specified in JIS L 1096 "8.21. measurement methods for bending resistance", and results of the bending resistance of the samples cut out in the long side direction and the short side direction of the sanitary mask are averaged.

When the sanitary mask sheet of the present invention includes one projecting-and-depressed sheet, for example, a sanitary mask sheet 10 (first embodiment) with the following configuration is presented.

The sanitary mask sheet 10 (hereinafter simply referred to as a sheet 10 in other words) of the first embodiment includes a projecting-and-depressed sheet 8 including a plurality of projections 1 projecting outward in a thickness direction and depressions 2 between the plurality of projections 1 on one surface (first surface) 1S in the natural state of the sanitary mask sheet 10.

As the projecting-and-depressed sheet 8, a single layer body including only the above-described fine fiber layer A, and a laminated body in which the fine fiber layer A and the other sheet are laminated are included. In the following, a description will be given with a projecting-and-depressed sheet 8A and a projecting-and-depressed sheet 8B as specific examples of the single layer body including only the fine fiber layer A. A description will be given with a projecting-and-depressed sheet 8C as a specific example of the laminated body of the fine fiber layer A and the other sheet.

Figure 3:
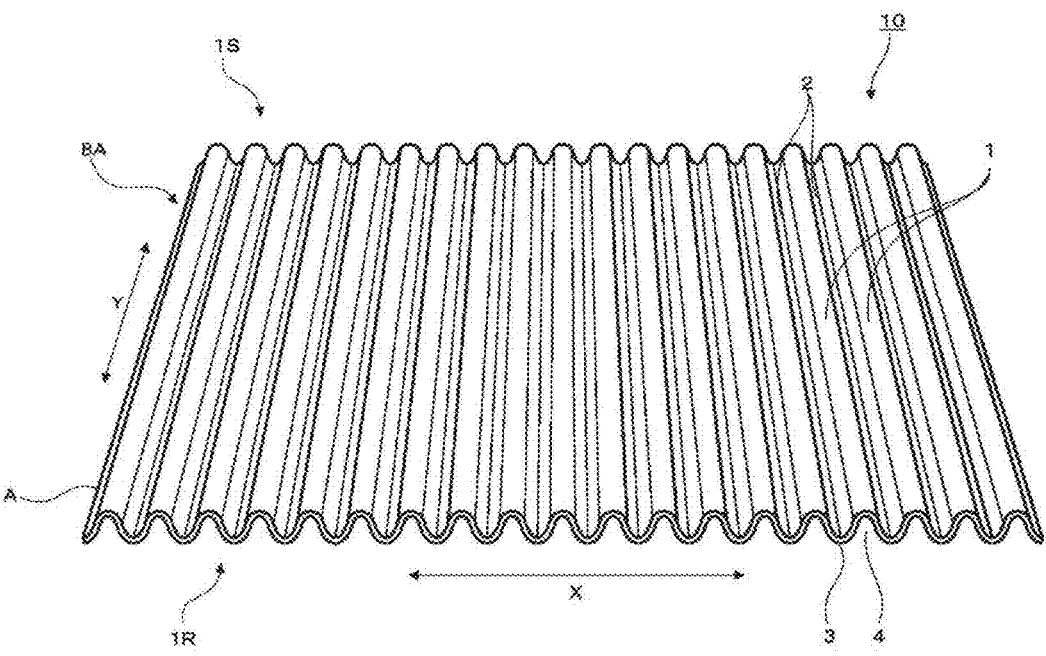
FIG. 3 is a perspective view illustrating an example of a sanitary mask sheet of a first embodiment.

In the projecting-and-depressed sheet 8A constituting the sanitary mask sheet 10 of the first embodiment, the projection 1 of the first surface 1S has a shape extending in one direction in plan view of the projecting-and-depressed sheet 8A. A plurality of the projections 1 are provided. Typically, the projection 1 continuously extends in one direction, and a plurality of the projections 1 are provided to be separated at regular intervals in another direction intersecting with the one direction over the whole surface of the first surface 1S. The specific example of the projecting-and-depressed sheet 8A is illustrated in FIG. 3. In the example illustrated in FIG. 3, the above-described one direction is a Y-direction, and the other direction intersecting with the one direction is an X-direction.

The depression 2 also has a shape continuously extending along the same direction as the direction in which the projection 1 extends in plan view of the first surface 1S. A plurality of the depressions 2 are provided. Typically, the depression 2 continuously extends in one direction, and a plurality of the depressions 2 are provided to be separated at regular intervals in a direction intersecting with the above-described one direction over the whole surface of the first surface 1S.

Accordingly, the first surface 1S of the sheet 10 has a furrow-ridge structure in which the projections 1 and the depressions 2 extending in the one direction Y are alternately provided in the other direction X intersecting with the one direction Y.

The one direction Y and the other direction X can be arbitrarily determined, and are preferably mutually perpendicular directions. The one direction Y and the intersecting other direction X are preferably the short side direction and the long side direction of the sheet 10. Further, it is preferred that the one direction Y is directed in a direction along a median line connecting the nose, the mouth, and the jaw of the wearer of the sanitary mask, and the intersecting other direction X is directed in a direction from the mouth toward the ears of the wearer of the sanitary mask.

When the other direction X is directed in the direction from the mouth toward the ears of the wearer of the sanitary mask, the direction in which the projections 1 and the depressions 2 are alternately provided is also directed in the same direction. This makes the sanitary mask sheet 10 including the projecting-and-depressed sheet 8A easy to be stretched in the stretching direction when the sanitary mask is put on the ears, and allows contributing to the improvement of the soft touch of the sanitary mask, the improvement of wearability of the sanitary mask, and the improvement of the close-contact performance.

In the sanitary mask sheet 10 of the first embodiment, also on the second surface 1R as an opposite surface of the first surface 1S, a plurality of projections 3 projecting outward in the thickness direction and depressions 4 between the plurality of projections 3 in the natural state of the sanitary mask sheet 10 are provided. Also on the second surface 1R, the projections 3 and the depressions 4 extend in the one direction X, and a plurality of projections 3 and depressions 4 are alternately provided in the other direction X. The depression 4 on the second surface 1R corresponds to the projection 1 on the first surface 1S, and the projection 1 and the depression 4 are in a relation of front and back. The projection 3 on the second surface 1R corresponds to the depression 2 on the first surface 1S, and the depression 2 and the projection 3 are in a relation of front and back. In such an arrangement relation, the projection 1 of the first surface 1S and the projection 3 of the second surface 1R are each formed to have a hollow inside. Accordingly, the sheet 10 has a corrugated plate shape like a corrugated galvanized iron having both uneven surfaces.

The sanitary mask sheet 10 of the first embodiment is the projecting-and-depressed sheet 8A made of the fine fiber layer A, and this allows increasing an effective area of the filtration function and thus further enhancing the above-described capture rate and the capture amount.

Simultaneously, the fine fiber layer A is a very soft layer formed of ultrafine fibers as described above, and using the projecting-and-depressed sheet 8A increases the volume while keeping the softness, thus enhancing the cushioning characteristic. Additionally, using the projecting-and-depressed sheet 8A increases resistance against pressing or stretching of the fine fiber layer A, and thus the high volume is easily held. Accordingly, in the sanitary mask sheet 10, not only the high above-described capture efficiency, but also the soft touch can be further enhanced.

The uneven structure of the projecting-and-depressed sheet 8A leads to increasing the effective area through which air passes, thus allowing reduction of pressure loss of the air. Conventionally, generally, improving the above-described capture rate by increasing the average fiber diameter, the density, or the like of the sheet easily reduces the air permeability of the sheet, and it is difficult to simultaneously improve both performances. In contrast, by using the fine fiber layer A for the projecting-and-depressed sheet 8A, the sanitary mask sheet 10 of the first embodiment can be improved simultaneously in both the above-described capture rate and air permeability. Accordingly, the sanitary mask sheet 10 of the first embodiment is provided with the enhanced filtration function to particles and the like in the sanitary mask and simultaneously allows easy respiration, and the sanitary mask sheet 10 of the first embodiment can keep both the above-described high capture efficiency to particles and the like and the soft touch for a longer period even in the repeated use and the use for a long time.

Further, when the sanitary mask sheet 10 is applied to the sanitary mask and worn on the face, mainly the projections 1 of the projecting-and-depressed sheet 8A abut on the skin, and the contacted area is reduced. Therefore, the friction with skin is substantially decreased, and the wearing comfort of the sanitary mask sheet 10 and the sanitary mask using it is increased.

With the arrangement of the projections 1 and the depressions 2 extending in the one direction Y as described above, even when the sanitary mask sheet 10 is stretched in the X-direction, the fiber structure of the fine fiber layer A does not change as long as the fine fiber layer A is in the state before the unevenness is lost. Therefore, the sanitary mask sheet 10 can suppress the change of the capture efficiency due to the deformation, and provide the stable capture performance.

The improvement of the air permeability by the projecting-and-depressed sheet 8A will be described in further detail.

A phenomenon that a person respires through a mask is a phenomenon that a pressure difference is generated inside the mask relative to the external pressure by the contraction of lung and the like, and this pressure difference causes an airflow passing through the mask. Generally, since the mask including the filtration layer with higher capture rate has the larger resistance to the airflow, for ensuring the air amount necessary for respiration, it is necessary to generate the larger pressure difference. This causes a feeling of smothering. This also causes stuffiness. Here, provisionally, when the pressure difference is the same and the effective area of the filtration layer is double, while the air flow rate per unit area of the filtration layer does not change, the total air flow rate becomes double. In other words, even with the filtration layer having the high capture performance, increasing the effective area through which air passes can provide the sufficient air flow rate with the small pressure difference.

Accordingly, in the sanitary mask sheet 10 of the first embodiment, forming the fine fiber layer A in the shape of the projecting-and-depressed sheet 8 is effective for the reduction of the air flow resistance, that is, the improvement of the air permeability.

The air flow resistance of the sanitary mask sheet 10 is preferably low as much as possible while the above-described capture rate of microparticles is kept at high level. From this aspect, the air flow resistance of the sanitary mask sheet 10 is preferably 0.5 kPa·s/m or less, and from the aspect of allowing more smooth respiration, the air flow resistance of the sanitary mask sheet 10 is more preferably 0.4 kPa·s/m or less, and further preferably 0.3 kPa·s/m or less. The lower the value of the air flow resistance is, the smoother the respiration becomes, and this means that the stuffiness is less likely to be caused.

The air flow resistance of the sanitary mask sheet 10 is practically more than 0 kPa·s/m.

The above-described range of the air flow resistance is preferably satisfied in not only the sanitary mask sheet 10 of the first embodiment but also sanitary mask sheets having various layer structures including sanitary mask sheets 20 and 30 described below.

(Method for Measuring Air Flow Resistance)

The air flow resistance is measured using an air permeability measuring machine (manufactured by KATO TECH CO., LTD. "KES-F8-AP1," product name). A sanitary mask sheet as a measurement target is secured so as to cover a vent of the air permeability measuring machine, and the air flow resistance (kPa·s/m) when air at 25° C. and RH 50% passes through the sheet is measured.

In the sanitary mask sheet 10 of the first embodiment, at least one of the projections 1 of the first surface 1S and the projections 3 of the second surface 1R provided to the projecting-and-depressed sheet 8A are preferred to have a hollow inside. This provides the sanitary mask sheet 10 with further soft touch. That is, when an external force is applied in the thickness direction, there is an advantage that the projections develop a buffer action to the external force and provide a high feeling of cushioning. In addition, since the projections are easily flexibly deformed when the projections receive a lateral external force, there is also an advantage that the friction with skin is reduced. Compared with a case where the inside of the projection is solid, there is also an advantage that the increase of the air flow resistance can be effectively suppressed.

"Hollow" as termed herein means a space not substantially filled with fibers inside the first projection 1 and the second projection 3. Specifically, the hollow means a space, whose fiber density is less than 5 fibers/mm$^2$. "Solid" as termed herein refers to that the inside of the back surface side 10R of the projection 1 is substantially filled with fibers, specifically, means that the fiber density is 5 fibers/mm$^2$ or more.

(Method for Confirming Whether or not to have a Hollow Inside)

The projecting-and-depressed sheet is immersed in liquid nitrogen to be frozen, and cut in the thickness direction in the state of remaining frozen by a razor so as to pass through the top of the measurement-target projection. A SEM is used to magnify the cut surface and count the cross-sections of the cut fibers within a cut surface with a given area. The magnification observation is performed with a magnification (between 150× or more and 500× or less) adjusted such that about 30 to 60 fiber cross-sections can be measured. Next, the counted number is converted to the number of cross sections of fibers per 1 mm$^2$, and the resulting number is used as a fiber density (fibers/mm$^2$). An average of the measurement results at three locations is obtained to be used as the final fiber density of the sample. Various devices can be used as the SEM. For example, JCM-5100 (trade name) produced by JEOL Ltd. can be used.

The uneven structure of the projecting-and-depressed sheet 8 constituting the sanitary mask sheet 10 is not limited to the above-described one, and various configurations can be employed insofar as the above-described effects of the sanitary mask sheet of the present invention are not impaired.

For example, as a modification of the projecting-and-depressed sheet 8A, the second surface 1R may be flat. The projections 1, 3 may be solid.

As another modification, a projecting-and-depressed sheet 8B in which the projection 1 of the first surface 1S does not have the continuously extending shape, but is intermittently disposed is presented. In the one direction Y, the projections 1 and the depressions 2 are alternately disposed to make a row. The projecting-and-depressed sheet 8B has a configuration similar to the projecting-and-depressed sheet 8A except that the shapes of the projection 1 and the depression 2 are different.

On the first surface 1S of the projecting-and-depressed sheet 8B, the projections 1 are disposed to be scattered.

Figure 4:
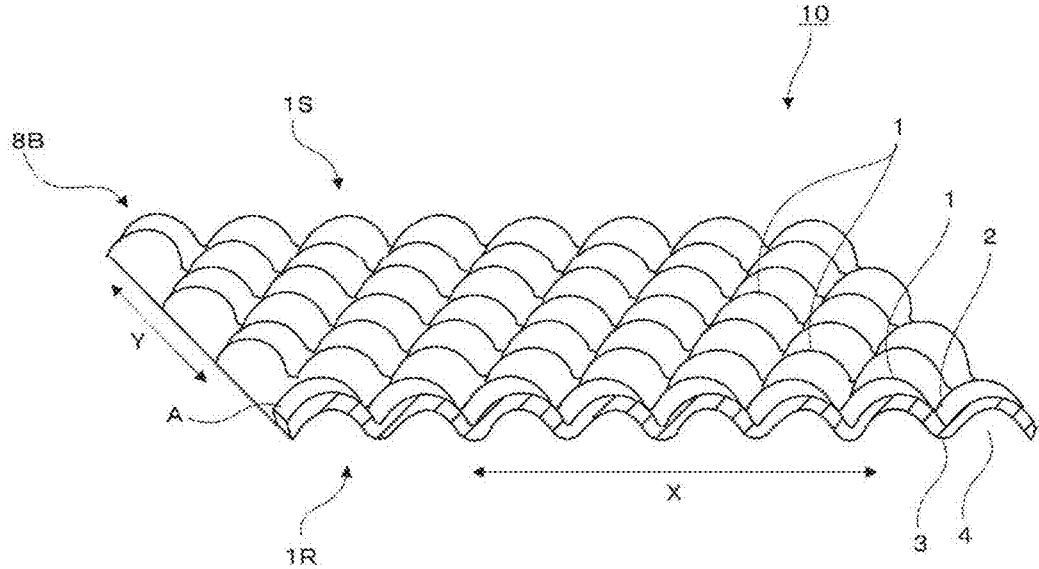
FIG. 4 is a perspective view illustrating another example of a sanitary mask sheet of a first embodiment.

The specific example of the projecting-and-depressed sheet 8B is illustrated in FIG. 4.

On the first surface 1S of the projecting-and-depressed sheet 8B, the scattered projections 1 are preferably arranged to be regularly separated. For example, it is preferred that the projections 1 and the depressions 2 are alternately disposed along the one direction Y in a row, and a plurality of the rows are arranged in parallel in the other direction X. Accordingly, the projections 1 are arranged in a state of intermittently extending in the one direction. At this time, it is preferred that the projections 1 and the depressions 2 are alternately disposed to make a row also in the other direction X. Specifically, in the arrangement, it is preferred that in the "rows in which the projections 1 and the depressions 2 are alternately disposed along the one direction Y" mutually adjacent in the other direction X, the projections 1 in one row are not aligned with the projections 1 in the other row in the other direction X. Especially, it is preferred that in the "rows in which the projections 1 and the depressions 2 are alternately disposed along the one direction Y" mutually adjacent in the other direction X, the projection 1 in one row is disposed between the projections 1, 1 arranged in the Y-direction in the other row. Accordingly, in the projecting-and-depressed sheet 8B, similarly to the projecting-and-depressed sheet 8A, the projections 1 and the depressions 2 are alternately disposed in the other direction X.

In the sanitary mask sheet of the first embodiment including the projecting-and-depressed sheet 8B in which the projections 1 are disposed to be scattered as described above, the projections and the depressions may be disposed in a staggered shape or in parallel, and may be randomly disposed. The shapes of the projection and the depression are not limited to a circular shape, an elliptical shape, a square shape, or an irregular shape. The projections and the depressions having a plurality of different sizes may be disposed.

In the projecting-and-depressed sheet 8B, the second surface 1R can have the configuration in which the uneven structure of the first surface 1S illustrated in FIG. 4 described above is reversed similarly to the configuration of the projecting-and-depressed sheet 8A, and can have a different configuration. The second surface 1R may be flat, and the projection may be solid.

When the sanitary mask sheet of the present invention includes the projecting-and-depressed sheet 8B as described above, the air flow resistance can be effectively reduced to make the respiration easy, and the contacted area can be more reduced when worn on the face. Therefore, the friction with skin is substantially decreased, and the wearing comfort of the sanitary mask sheet 10 and the sanitary mask using it is further increased.

In the sanitary mask sheet 10, the height of the projection 1 of the projecting-and-depressed sheet 8 on the first surface 1S is preferably set as follows in the natural state. Here, the "height of the projection 1" means a height difference E in the thickness direction between a top of a projection 1 and a surface in the first surface 1S side of a bottom portion of a depression 2 adjacent to the projection 1 as illustrated in FIG. 5 when the sanitary mask sheet 10 is left to stand on a horizontal surface having the second surface 1R in the lower side and its side surface is viewed. The thickness direction at this time means the vertical direction relative to the above-described horizontal surface on which the projecting-and-depressed sheet 8 is left to stand.

The height of the projection 1 on the first surface 1S in the natural state is preferably 1 mm or more, more preferably 1.5 mm or more, further preferably 2 mm or more. Such a height difference becomes farther larger than one provided by ordinary embossing. This allows enhancing the cushioning characteristic of the sanitary mask sheet 10 in the projections 1, and the soft touch can be further improved.

Moreover, the height of the projection 1 on the first surface 1S in the natural state is preferably 4 mm or less, more preferably 3.5 mm or less, and further preferably 3 mm or less. Accordingly, since the shape stability of the projection 1 increases, and the thickness of the sanitary mask is decreased, the uncomfortable feeling at the wearing can be reduced. Consequently, even in the repeated use and the use for a long time of the sanitary mask sheet 10, both the above-described high capture efficiency to particles and the like and the soft touch can be kept for a longer period.

In the projecting-and-depressed sheet 8, when the second surface 1R has the uneven structure, the above-described requirement for the height of the projection 1 on the first surface 1S is preferably satisfied also for the second surface 1R. When the above-described requirement for the height of the projection 1 is satisfied by both surfaces of the first surface 1S and the second surface 1R, the above-described effects can be further enhanced.

(Method for Measuring Height Difference E in Thickness Direction Between Top of Projection 1 and Surface in First Surface 1S Side of Bottom Portion of Depression 2 Adjacent to Projection 1)

The above-described height difference E can be measured by a method below.

First, as illustrated in FIG. 5, T1 is measured as a thickness between the front and the back surfaces of the sanitary mask sheet 10. This means a height in the vertical direction from a position in a horizontal surface to a top of a projection 1 when the second surface 1R of the sanitary mask sheet 10 is left to stand on the horizontal surface.

Next, T2 is measured as a height of a surface in the first surface 1S side of the bottom portion of the depression 2. This means a height in the vertical direction from the above-described position in the horizontal surface to the surface in the first surface 1S side of the bottom portion of the depression 2.

Based on the above-described measurements, the height difference E can be calculated by T1−T2.

As a specific measuring method, it is only necessary that an image of a cross section in the thickness direction of the sanitary mask sheet 10 is enlarged and taken by a microscope, and the height difference E, in other words, a hollow space height E is directly measured by image processing. Alternatively, the mask sheet 10 may be scanned by a laser displacement meter from the upper surface to measure T1 and T2, thereby calculating the height difference E. In the projecting-and-depressed sheet 8, even when a protection sheet 81 described later is laminated with a sheet other than the protection sheet (see FIG. 7), since the definition of the height difference E does not change, the measurement is simply performed by the similar method. Also in the case of a sanitary mask sheet 20 of a second embodiment and a sanitary mask sheet 30 of a third embodiment described below, the definition of the height difference E does not change, and the measurement is simply performed by the similar method. In this case, the above-described thickness T1 is the total thickness in the vertical direction of the projecting-and-depressed sheet 8 and a base sheet 91 in both cases of the second embodiment and the third embodiment (see FIGS. 8(A) and 8(B)).

From the aspect of allowing effectively decreasing the air flow resistance to make the respiration easy, ensuring the cushioning characteristic by the projecting-and-depressed sheet 8, and holding the soft touch, the thickness (T1) between the front and the back surfaces of the sanitary mask sheet 10 is preferably 1 mm or more, more preferably 1.5 mm or more, and further preferably 2 mm or more.

From the aspect of improving the handleability and improving the appearance of the sanitary mask sheet 10, the thickness (T1) between the front and the back surfaces of the sanitary mask sheet 10 is preferably 6 mm or less, more preferably 5 mm or less, and further preferably 4 mm or less.

Further, in plan view of the first surface 1S side in the natural state of the sanitary mask sheet 10, a distance between centers of the adjacent projections 1 of the projecting-and-depressed sheet 8, that is, a pitch of the projection 1 is preferably 6 mm or less, more preferably 5 mm or less, and further preferably 4 mm or less. This allows the sanitary mask sheet 10 to efficiently increase the surface area provided by the unevenness, thus allowing effectively decreasing the air flow resistance to make the respiration easy. The contacted area with skin can be decreased to substantially reduce the friction with skin, and the wearing comfort of the sanitary mask sheet 10 and the sanitary mask using it can be further enhanced. In addition, the work of compression in the thickness direction of the sanitary mask sheet 10 can be improved, thereby allowing providing the softness of the touch when worn on the face.

In plan view of the sanitary mask sheet 10 in the natural state, the distance between centers of the adjacent projections 1 is preferably set to 1 mm or more, further preferably set to 1.5 mm or more, and furthermore preferably set to 2 mm or more. This increases the shape stability of the projection 1. Consequently, even in the repeated use and the use for a long time of the sanitary mask sheet 10, both the above-described high capture efficiency to particles and the like and the soft touch can be kept for a longer period.

In the projecting-and-depressed sheet 8, when the second surface 1R has the uneven structure, the above-described requirement for the pitch of the projection 1 on the first surface 1S is preferably satisfied also for the second surface 1R. When the above-described requirement for the pitch of the projection 1 is satisfied by both surfaces of the first surface 1S and the second surface 1R, the above-described effects can be further enhanced.

In the natural state of the sanitary mask sheet 10, the area in plan view from the first surface 1S side of the constituting projecting-and-depressed sheet 8 (for example, the above-described projecting-and-depressed sheet 8A and projecting-and-depressed sheet 8B) is preferably as follows.

First, a unit area in planar projection view of the first surface 1S side of the projecting-and-depressed sheet 8 is assumed as S0, and a surface area of unevenness in the unit area S0 is assumed as S1. At this time, because of the uneven structure provided to the first surface 1S of the projecting-and-depressed sheet 8, the value of S1 is preferably made larger than the value of S0. That is, the uneven structure provided in the first surface 1S side of the sheet 10 increases the effective area through which air passes compared with the case where the first surface 1S side of the sheet 10 does not have the uneven structure. The increase of the effective area allows effectively reducing the air flow resistance of the sheet 10. In addition, the above-described filtration performing area to particles and the like increases, and the above-described capture rate is easily enhanced.

From this aspect, in the natural state of the sheet 10, the ratio (S1/S0) of the unevenness surface area S1 per unit area S0 in planar projection view is preferably more than 1, further preferably 1.3 or more, and furthermore preferably 1.5 or more.

From the aspect of form stability of the projection, in the natural state of the sheet 10, the ratio of the unevenness surface area S1 per unit area S0 in planar projection view is preferably 3 or less, further preferably 2.8 or less, and furthermore preferably 2.5 or less.

In the projecting-and-depressed sheet 8, when the second surface 1R has the uneven structure, the above-described requirement for the ratio of the unevenness surface area S1 per unit area S0 in the first surface 15 is preferably satisfied also for the second surface 1R. When the above-described requirement for the ratio of the unevenness surface area S1 per unit area S0 is satisfied by both surfaces of the first surface 1S and the second surface 1R, the above-described effects can be further enhanced.

(Method for Measuring Ratio of S1 to S0)

The projecting-and-depressed sheet 8 constituting the sanitary mask sheet 10 in the natural state is cut out by any area S0' (for example, 10 cm×10 cm=100 cm$^2$). An area S1' when the cut out projecting-and-depressed sheet 8 is in a flat state without a crease is measured, and the ratio of S1 to S0 is calculated from a formula below.

$$S1/S0 = S1'/S0'$$

However, when the projecting-and-depressed sheet 8 is joined with another sheet as described later, the projecting-and-depressed sheet 8 is possibly plastically deformed in delamination depending on the joining state. In such a case, for example, it is only necessary to cut the base sheet 91 by a cutter or the like at projections 1 (positions of upward arrows) at which the projecting-and-depressed sheet 8 of the second embodiment is separated from the base sheet 91 as illustrated in FIG. 6(A), and divide the base sheet 91 into individual independent small pieces. This allows stretching the projecting-and-depressed sheet 8 in a flat state (FIG. 6(B)), the above-described S1' can be measured. When the projecting-and-depressed sheet 8 is a laminated body of the fine fiber layer A and the protection sheet 81 as described later, the measurement may be performed by the method similar to the above-described method with these as an integrated one.

In the sanitary mask sheet 10 of the first embodiment, the projecting-and-depressed sheet 8 is not limited to the case of including only the fine fiber layer A, and may be a laminated body of the fine fiber layer A and another sheet. The other sheet may be one sheet, and may be two or more sheets. As the other sheet, those of various kinds of materials can be used, and a non-woven fabric is preferable from the aspect of touch. As the non-woven fabric, various kinds of non-woven fabrics can be used as described above. Among them, from the aspect of ensuring the strength of the sanitary mask sheet of the present invention and protecting the fine fiber layer A, a spunbonded non-woven fabric and a needlepunched non-woven fabric are preferable.

The above-described other sheet may be disposed on any of the first surface 1S and the second surface 1R of the projecting-and-depressed sheet 8 constituting the sanitary mask sheet 10.

As a specific examples of such a sanitary mask sheet 10, one including a projecting-and-depressed sheet 8C described below is presented.

The projecting-and-depressed sheet 8C has a configuration in which the fine fiber layer A is disposed on the second surface 1R, and the protection sheet 81 as the above-described other sheet is disposed on the first surface 1S. The fine fiber layer A and the protection sheet 81 are aligned and formed in an uneven shape in a state of being laminated. This specific example is illustrated in FIG. 7.

In the projecting-and-depressed sheet 8C, the uneven shape of the protection sheet 81 is preferably a shape complementary to the uneven shape of the fine fiber layer A, and it is preferred that the protection sheet 81 has a shape being laid along the fine fiber layer A.

It is preferred that the protection sheet 81 is in close contact with the fine fiber layer A without a void between them.

It is preferred that the protection sheet 81 and the fine fiber layer A are joined by entanglement of fibers, or joined by an adhesive. From the aspect of avoiding the deterioration of the texture of the sanitary mask sheet 10, it is preferred that the protection sheet 81 and the fine fiber layer A are joined by entanglement of fibers.

It is preferred that the projections of the protection sheet 81 are positioned at the same positions as the projections of the fine fiber layer A. Similarly, it is preferred that the depressions of the protection sheet 81 are positioned at the same positions as the depressions of the fine fiber layer A.

In the projecting-and-depressed sheet 8C of such a laminated body, the uneven structure in the planar direction can have various forms, and for example, the above-described projecting-and-depressed sheet 8A, projecting-and-depressed sheet 8B, and the like are presented.

In the projecting-and-depressed sheet 8C, presence of the protection sheet 81 can avoid direct application of an external force to the fine fiber layer A. Accordingly, degradation of the performance of the fine fiber layer A due to a damage or the like can be suppressed. Especially, it is effective when the first surface 1S of the projecting-and-depressed sheet 8C is a skin-contacting surface of the sanitary mask. From this aspect, it is preferred that the protection sheet 81 in the uneven shape has the above-described bending resistance.

For the lamination of the fine fiber layer A and the protection sheet 81, it is preferred that spun fibers are accumulated on one surface of the protection sheet 81 produced in advance to obtain the fine fiber layer A from the aspect of productivity. For example, on one surface of a web of a spunbonded non-woven fabric produced in advance, fibers spun by the electrospinning method are accumulated, thus allowing producing the projecting-and-depressed sheet 8C. Accordingly, the protection sheet 81 and the fine fiber layer A can be joined by the entanglement of fibers.

In the projecting-and-depressed sheet 8C, from the aspect of providing the higher strength to the protection sheet 81 than the fine fiber layer A, it is preferred that the average fiber diameter of the protection sheet 81 is greater than the average fiber diameter of the fine fiber layer A. It is preferred that the average fiber diameter of the protection sheet 81 is appropriately determined within a range satisfying the above-described requirement for the ratio (Q2/Q1) of the average fiber diameter (Q2) of the other sheet to the average fiber diameter (Q1) of the fine fiber layer A.

From the aspect similar to the above description, it is preferred that the density of the protection sheet 81 is lower than the density (M1) of the fine fiber layer A.

In the projecting-and-depressed sheet 8C, the basis weight of the fine fiber layer A coated over the protection sheet 81 is preferably within the above-described range.

From the aspect of providing the higher strength to the protection sheet 81 than the fine fiber layer A, it is preferred that the basis weight of the protection sheet 81 is greater than the basis weight of the fine fiber layer A.

From the aspect of ensuring the strength and the flexibility of the protection sheet 81 and protecting the fine fiber layer A, the basis weight of the protection sheet 81 is preferably 5 g/m$^2$ or more, more preferably 10 g/m$^2$ or more, and further preferably 12 g/m$^2$ or more.

From the aspect of reducing the rigidity of the projecting-and-depressed sheet 8, ensuring the cushioning characteristic by the projecting-and-depressed sheet 8, holding the soft touch, and gapless fitting when worn on the face of a person, the basis weight of the protection sheet 81 is preferably 30 g/m$^2$ or less, more preferably 20 g/m$^2$ or less, and further preferably 18 g/m$^2$ or less.

In the projecting-and-depressed sheet 8C, it is preferred that the above-described requirements for the height (T1–T2) of the projection 1, the pitch of the projection 1, and the ratio (S1/S0) of the unevenness surface area S1 per unit area S0 in planar projection view are satisfied as a whole of the laminated body of the fine fiber layer A and the protection sheet 81.

In the projecting-and-depressed sheet 8C, the protection sheet 81 not only protects the fine fiber layer A, but also functions to complement the capture performance to particles and the like of the fine fiber layer A. That is, the protection sheet 81 includes relatively thick fibers as a protecting material for the fine fiber layer A, and captures relatively large particles. Therefore, the fine fiber layer A can be specialized in capturing microparticles having smaller particle diameters, and consequently, it can be expected to extend the product lifetime of the projecting-and-depressed sheet 8C as a filtration material. Thus, from the aspect of assigning the capturing function to the protection sheet 81 and the fine fiber layer A, it is preferred that the capture rate of the protection sheet 81 is lower than the capture rate of the fine fiber layer A, and there is a difference to some extent between both capture rates.

From this aspect, it is preferred that the protection sheet 81 is lower than the fine fiber layer A in capture rate of particles having the particle diameter of more than 1 μm. Specifically, the protection sheet 81 has the capture rate of particles having the particle diameter of more than 1 μm of preferably 0% or more and less than 60%, and more preferably less than 50%.

Next, when the sanitary mask sheet of the present invention includes a laminated body of the projecting-and-depressed sheet 8 and another sheet, for example, a sanitary mask sheet 20 (second embodiment) having a configuration below is presented.

The sanitary mask sheet 20 (hereinafter simply referred to as a sheet 20 in other words) of the second embodiment includes a planar-shaped base sheet 91 as the other sheet laminated on the second surface 1R of the projecting-and-depressed sheet 8.

The projecting-and-depressed sheet 8 may be one including a single layer of only the fine fiber layer A as described above (for example, projecting-and-depressed sheets 8A, 8B), and may be one in which the fine fiber layer A is laminated with the other sheet (for example, protection sheet 81) (for example, projecting-and-depressed sheet 8C). When the projecting-and-depressed sheet 8C is used, it is preferred that the fine fiber layer A side of the projecting-and-depressed sheet 8C is faced to the base sheet 91 to be laminated. Accordingly, the fine fiber layer A is not exposed from either surface of the first surface 1S and the second surface 1R, and the high capture rate and the tender touch of the sanitary mask sheet 20 can be kept.

Figure 8A:
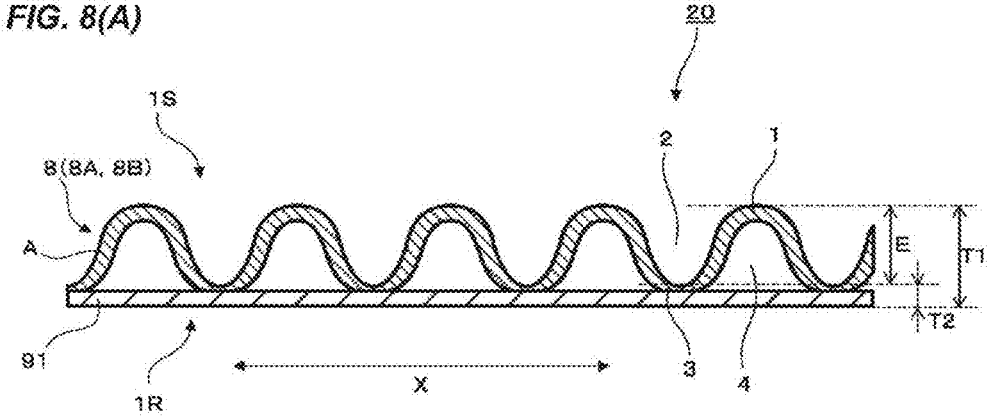
FIG. 8(A) illustrates an example of a laminated body of a projecting-and-depressed sheet including a fine fiber layer and a base sheet.
Figure 8B:
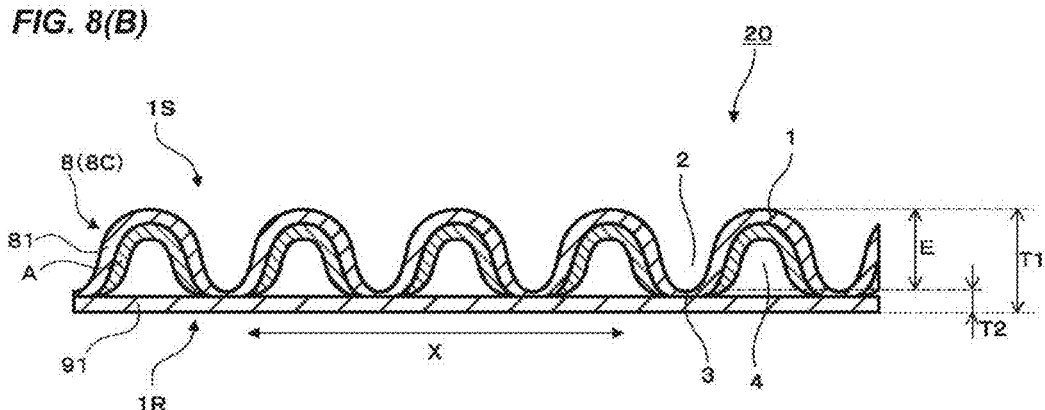
FIG. 8(B) illustrates an example of a laminated body of a projecting-and-depressed sheet including a fine fiber layer and a protection sheet and a base sheet.

These specific examples are shown in FIGS. 8(A) and 8(B).

In the sanitary mask sheet 20 of the second embodiment, it is preferred that the projecting-and-depressed sheet 8 satisfies the various requirements described in the above-described sanitary mask sheet 10 of the first embodiment.

As the uneven structure of the projecting-and-depressed sheet 8, those of various kinds of forms can be used, and for example, the uneven structure described in the above-described projecting-and-depressed sheet 8A and projecting-and-depressed sheet 8B are included.

As the base sheet 91, as described above in the other sheet, those of various kinds of materials can be used, and a non-woven fabric is preferable from the aspect of the touch. As the non-woven fabric, various kinds of non-woven fabrics can be used as described above.

Figures 9A, 9B, 9C, 10A, 10B, 10C:
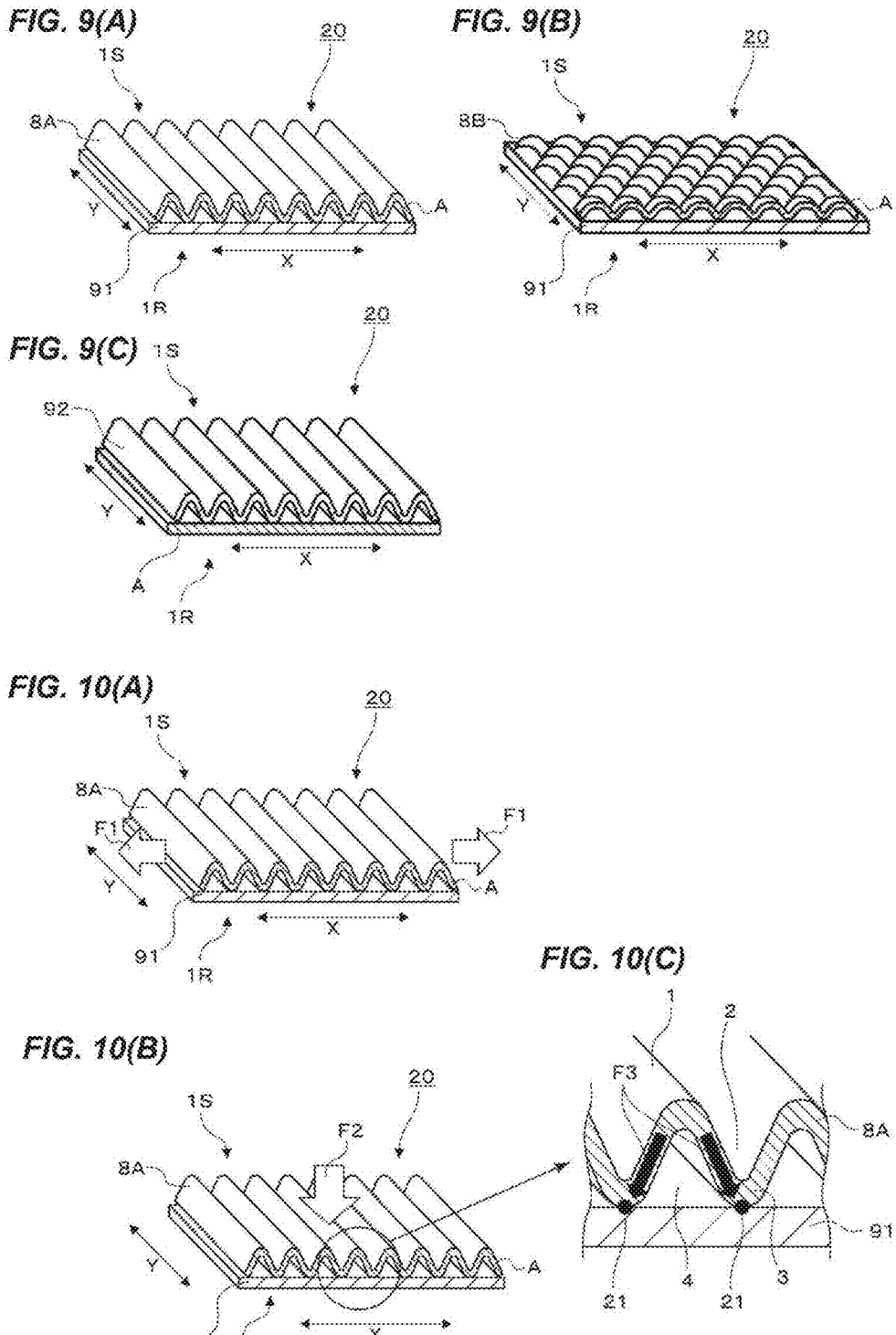
FIG. 9(B) illustrates an example of a laminated body of a projecting-and-depressed sheet including a fine fiber layer with an uneven structure illustrated in FIG. 4 and a base sheet.
FIG. 9(C) illustrates an example of a laminated body of a projecting-and-depressed sheet without a fine fiber layer and a base sheet including a fine fiber layer.
FIG. 10(A) is an explanatory view illustrating a stretching direction of the sanitary mask sheet of the second embodiment.
FIG. 10(B) is an explanatory view illustrating a state of applying a compressive load.
FIG. 10(C) is an explanatory view schematically illustrating a route of propagation of the compressive load in the state of FIG. 10(B).

Specific examples of the sanitary mask sheet 20 including the above-described uneven structure are illustrated in FIGS. 9(A) and 9(B).

In the specific example illustrated in FIG. 9(A), the projecting-and-depressed sheet 8A is laminated with the base sheet 91.

In the specific example illustrated in FIG. 9(B), the projecting-and-depressed sheet 8B is laminated with the base sheet 91.

In the sanitary mask sheet 20, from the aspect of providing the higher strength to the base sheet 91 than the fine fiber layer A, it is preferred that the average fiber diameter of the base sheet 91 is greater than the average fiber diameter of the fine fiber layer A. It is preferred that the average fiber diameter of the base sheet 91 is appropriately determined within a range satisfying the above-described requirement for the ratio (Q2/Q1) of the average fiber diameter (Q2) of the other sheet to the average fiber diameter (Q1) of the fine fiber layer A.

From the aspect similar to the above description, it is preferred that the density of the base sheet 91 is lower than the density (M1) of the fine fiber layer A.

In the sanitary mask sheet 20, the basis weight of the fine fiber layer A laminated with the base sheet 91 is preferably within the above-described range.

From the aspect of providing the higher strength to the base sheet 91 than the fine fiber layer A, it is preferred that the basis weight of the base sheet 91 is greater than the basis weight of the fine fiber layer A.

From the aspect of enhancing the strength of the base sheet 91 and ensuring the shape retention performance of the sanitary mask sheet, the basis weight of the base sheet 91 is preferably 5 g/m$^2$ or more, more preferably 10 g/m$^2$ or more, and further preferably 15 g/m$^2$ or more.

From the aspect of reducing the rigidity and the air flow resistance of the projecting-and-depressed sheet 8 to enhance the wearing comfort of the sanitary mask sheet 20 and the sanitary mask using it, the basis weight of the base sheet 91 is preferably 55 g/m$^2$ or less, more preferably 50 g/m$^2$ or less, and further preferably 45 g/m$^2$ or less.

Since the sanitary mask sheet 20 is the laminated body of the projecting-and-depressed sheet 8 and the base sheet 91, the shape of the projecting-and-depressed sheet 8 is stabilized, and the shape recovery performance after pressing is more enhanced. Additionally, the appropriate compressive elasticity is provided. In addition, the strength of the entire sanitary mask sheet 20 is increased. Especially, as illustrated in FIG. 10(A), even when the sanitary mask sheet 20 is stretched in the X-direction (direction of arrow F1) in which the unevenness is repeated, the shape is less likely to be lost, and the shape is easily recovered after the stretched state is released. Even when being pressed in the thickness direction, the uneven structure of the projecting-and-depressed sheet 8 is easily recovered.

Accordingly, even when the external force is repeatedly applied, the sanitary mask sheet 20 sufficiently holds and easily keeps the filtration function, the soft touch, the air permeability, and the stuffiness reduction performance described above.

It is preferred that the projecting-and-depressed sheet 8 is joined with the base sheet 91 at the depressions 2. More specifically, it is preferred that the surface in the second surface 1R side of the depression 2 of the first surface 1S is joined with the base sheet 91. Various methods are employable for the joining, and examples of the method include fusion bonding by embossing and bonding by an adhesive. As the embossing, various methods ordinarily used in this type of articles are employable. For example, heat embossing, ultrasonic embossing, and the like are included. The embossing is preferably dot embossing at a grounding portion between the projecting-and-depressed sheet 8 and the base sheet 91.

This specific example is illustrated in FIGS. 10(B) and 10(C). In FIG. 10(C), the above-described joining is indicated by joint points 21.

This joining provides an arch structure to the projection 1, and strength against a compressive load F2. That is, the compressive load F2 applied to the first surface 1S branches and propagates from the tops of the projections 1 to skirts (arrows F3, F3), and is dispersedly absorbed at joint points 21. In addition, arranging the joint points 21 at the depressions 2 depressed between the projections 1 reduces the contact with skin, and since this suppress the joint region, the compressive elasticity of the projecting-and-depressed sheet 8 is reduced, thus holding the cushioning characteristic and the soft touch by the projecting-and-depressed sheet 8.

Figure 11:
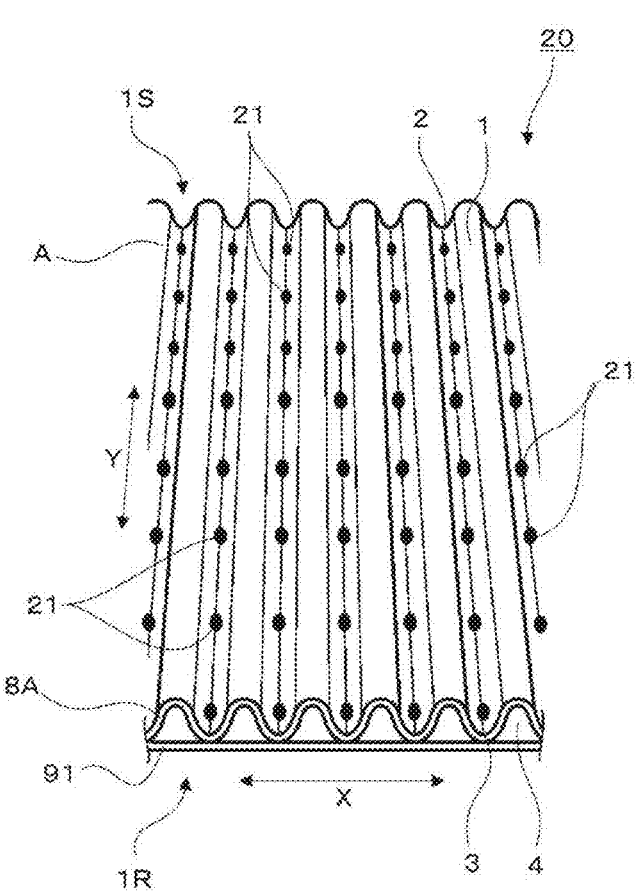
FIG. 11 is a perspective view illustrating an example of an arrangement of joint points of the projecting-and-depressed sheet and the base sheet in the sanitary mask sheet of the second embodiment.

It is preferred that a plurality of joint points 21 are intermittently formed along a direction (the above-described one direction Y) in which the depression 2 extends, and form a joint point line. This specific example is illustrated in FIG. 11.

The shape of the joint point 21 is typically a circular shape. However, the shape of the joint point 21 is not limited thereto, and may have any shape other than the circular shape including a polygonal shape such as a triangular shape, a quadrangular shape, and a hexagonal shape, and the like.

The joint point 21 may have a length along the extending direction of the depression 2.

From the aspect of avoiding impairing the texture and the touch of the projecting-and-depressed sheet 8 and the base sheet 91, the joint points 21 are preferred to be intermittently formed. Also from the aspect of holding the soft touch of the sanitary mask sheet 10 and effectively suppressing the increase of the air flow resistance, the joint points 21 are preferred to be intermittently formed.

When focusing on one joint point line, distances between the joint points 21 adjacent along the extending direction of the depression 2 may be the same, and may be different. When focusing on one joint point line, all of the shapes of the individual joint points 21 constituting the joint point line may be the same, or joint points having different two or more kinds of shapes may be included.

The configuration of the two-layer structure of the sanitary mask sheet 20 of the second embodiment is not limited to the above-described one, and various configurations are employable as long as the effects of the present invention are not impaired.

For example, a modification in which the fine fiber layer A is a planar sheet and the other sheet is a projecting-and-depressed sheet 92 without the fine fiber layer A is presented. Since the sanitary mask sheet 20 has this configuration, the degree of freedom in selection of the projecting-and-depressed sheet material that contacts the face can be improved, and the functions such as an improvement of mechanical characteristic such as a compressive elasticity and providing moisture-retaining property can be added. The specific example is illustrated in FIG. 9(C).

As another modification, a configuration in which at least one of the projecting-and-depressed sheet 8 including the fine fiber layer A and the base sheet 91 includes a plurality of two or more laminated layers is presented. This allows further enhancing the above-described capture rate of particles and the like. For the compression property, by thickening the thickness of the whole sanitary mask sheet, the cushioning characteristic is improved, the soft touch is held, and the wearing comfort of the sanitary mask sheet 20 and the sanitary mask using it can be further enhanced.

For example, a configuration in which the projecting-and-depressed sheet 8 is further additionally disposed on the second surface 1R of the base sheet 91 is presented. Accordingly, in the sanitary mask sheet 20, when being worn on the face, the contact area with skin is reduced as described above in the surface that contacts the face, thus allowing substantially reducing the friction with skin, and the wearing comfort of the sanitary mask sheet 20 and the sanitary mask using it can be further enhanced. Additionally, since the uneven shape is disposed on the surface in the opposite side of the surface that contacts the face, the appearance is improved. Additionally, since the uneven shape is disposed on both surfaces of the sanitary mask sheet 20, the touch is good in handling with hands, and the excellent touch is provided. This specific example is illustrated in FIG. 12(A).

For example, a configuration of a laminated body including two sets of a combination of the projecting-and-depressed sheet 8 including the fine fiber layer A and the base sheet 91 is presented. Accordingly, in the sanitary mask sheet 20, by thickening the thickness of the whole sanitary mask sheet 20, the cushioning characteristic is improved, the soft touch is held, and the wearing comfort of the sanitary mask sheet 20 and the sanitary mask using it can be further enhanced. Additionally, since each of the projections of the projecting-and-depressed sheet 8 is joined with the base sheet 91, the shape of the projecting-and-depressed sheet 8 is stabilized, and the shape retention performance of the entire sanitary mask is improved. This specific example is illustrated in FIG. 12(B).

For example, a configuration in which another projecting-and-depressed sheet 8 is further laminated on the second surface 1R side of the laminated body including the two sets of the combination of the projecting-and-depressed sheet 8 including the fine fiber layer A and the base sheet 91 is presented. Accordingly, in the sanitary mask sheet 20, by further thickening the thickness of the whole sanitary mask sheet 20, the cushioning characteristic is significantly improved, the soft touch is held, and the wearing comfort of the sanitary mask sheet 20 and the sanitary mask using it can be further enhanced. Additionally, the uneven shape is disposed on the surface in the opposite side of the surface that contacts the face, thus improving the appearance, and since the uneven shape is disposed on both surfaces of the sanitary mask sheet 20, the touch is good in handling with hands, and the excellent touch is provided. This specific example is illustrated in FIG. 12(C).

In these modifications, the uneven structures of the plurality of projecting-and-depressed sheets 8 are not limited to those illustrated in FIGS. 12(A) to 12(C), and those having various configurations can be used. The projecting-and-depressed sheets 8 may have the same uneven structure, and may have the mutually different uneven structures. The plurality of base sheets 91 may be those of the same material, and may be those of mutually different materials.

As another configuration of the case where the sanitary mask sheet of the present invention includes the laminated body of the projecting-and-depressed sheet 8 and the other sheet, for example, a sanitary mask sheet 30 (third embodiment) having a configuration below is presented.

The sanitary mask sheet 30 (hereinafter simply referred to as a sheet 30 in other words) of the third embodiment includes a planar-shaped cover sheet 93 as the other sheet further laminated on the first surface 1S on which the projections 1 of the projecting-and-depressed sheet 8 project in the laminated body of the sanitary mask sheet 20 of the second embodiment. This forms a honeycomb structure by the sheets.

As the cover sheet 93, as described above in the other sheet, those of various kinds of materials can be used, and a non-woven fabric is preferable from the aspect of the touch. As the non-woven fabric, various kinds of non-woven fabrics can be used as described above.

Specific examples of the sanitary mask sheet 30 include, for example, those shown in FIGS. 13(A) and 13(B).

In the specific example illustrated in FIG. 13(A), the projecting-and-depressed sheet 8A is sandwiched between the base sheet 91 and the cover sheet 93.

In the specific example illustrated in FIG. 13(B), the projecting-and-depressed sheet 8B is sandwiched between the base sheet 91 and the cover sheet 93.

In the sanitary mask sheet 30, from the aspect of providing the higher strength to the cover sheet 93 than the fine fiber layer A, it is preferred to use the cover sheet 93 similar to the above-described base sheet 91.

Since the sanitary mask sheet 30 is the laminated body in which the projecting-and-depressed sheet 8B is sandwiched between the base sheet 91 and the cover sheet 93, the shape stability and the shape recovery performance after pressing of the projecting-and-depressed sheet 8 are further enhanced.

From this aspect, it is preferred that the projecting-and-depressed sheet 8 is joined with the cover sheet 93 at the projections 1. More specifically, it is preferred that the surface in the first surface 1S side of the projection 1 of the first surface 1S is joined with the cover sheet 93. It is preferred that the joining is made at the above-described joint points 21 described in the second embodiment. For the arrangement and the joining method of the joint points 21, similarly to the second embodiment, those of various kinds are preferred to be employed. In the third embodiment, for the distinction, the joint points of the projections 1 of the projecting-and-depressed sheet 8 and the cover sheet 93 are referred to as joint points 21A, and the joint points of the depressions 2 of the projecting-and-depressed sheet 8 and the base sheet 91 are referred to as joint points 21B in some cases.

This specific example is illustrated in FIGS. 14(A) and 14(B).

With this joining, the compressive load F2 applied to the sanitary mask sheet 30 in the thickness direction propagates from the joint points 21A in the cover sheet 93 side to the joint points 21B in the base sheet 91 side via the projecting-and-depressed sheet 8, and is dispersedly absorbed (arrows F3, F3). Even when a load is applied in the opposite direction, the above-described load propagates from the base sheet 91 side to the cover sheet 93 side, and is dispersedly absorbed. Accordingly, the load bearing property of the arch structure of the projection 1 is further enhanced, and the cushioning characteristic and the soft touch by the projecting-and-depressed sheet 8 are further enhanced.

The configuration of the three-layer structure of the sanitary mask sheet 30 of the third embodiment is not limited to the above-described one, and various configurations are employable as long as the effects of the present invention are not impaired.

For example, as a modification, a configuration in which at least one of the projecting-and-depressed sheet 8 including the fine fiber layer A, the base sheet 91, and the cover sheet 93 includes a plurality of two or more laminated layers is presented. This allows further enhancing the above-described capture rate of particles and the like. For the compression property, the cushioning characteristic of the sanitary mask sheet is improved, the soft touch is held, and the wearing comfort of the sanitary mask sheet 30 and the sanitary mask using it can be further enhanced.

For example, a configuration in which the projecting-and-depressed sheet 8 is further additionally disposed on the first surface 1S of the cover sheet 93 is presented. Accordingly, the sanitary mask sheet 30 is improved in resistance against the compressive load, and can provide a hard touch in cushioning characteristic. Additionally, since each of the projections of the projecting-and-depressed sheet 8 is joined with the cover sheet 93, the shape of the projecting-and-depressed sheet 8 is stabilized, and the shape retention performance of the entire sanitary mask is improved. This specific example is illustrated in FIG. 15(A).

For example, a configuration in which another projecting-and-depressed sheet 8 is disposed on both surfaces of the first surface 1S of the cover sheet 93 and the second surface 1R of the base sheet 91 is presented. Accordingly, in the sanitary mask sheet 30, by further thickening the thickness of the whole sanitary mask sheet of the sanitary mask sheet, the cushioning characteristic is significantly improved, the soft touch is held, and the wearing comfort of the sanitary mask sheet 30 and the sanitary mask using it can be further enhanced. Additionally, the uneven shape is disposed on the surface in the opposite side of the surface that contacts the face, thus improving the appearance, and since the uneven shape is disposed on both surfaces of the sanitary mask sheet 30, the touch is good in handling with hands, and the excellent touch is provided. This specific example is illustrated in FIG. 15(B).

For example, a configuration in which the projecting-and-depressed sheet 8 and the cover sheet 93 are further additionally disposed on the first surface 1S of the cover sheet 93, or a configuration in which the projecting-and-depressed sheet 8 and the base sheet 91 are further additionally disposed on the second surface 1R of the base sheet 91 is presented. Accordingly, in the sanitary mask sheet 30, by further thickening the thickness of the sanitary mask sheet 30, the cushioning characteristic is significantly improved, the soft touch is held, and the wearing comfort of the sanitary mask sheet 30 and the sanitary mask using it can be further enhanced. Additionally, since each of the projections of the projecting-and-depressed sheet 8 is joined with the cover sheet 93, the shape of the projecting-and-depressed sheet 8 is stabilized, and the shape retention performance of the entire sanitary mask is improved. This specific example is illustrated in FIG. 15(C).

In these modifications, the uneven structures of the plurality of projecting-and-depressed sheets 8 are not limited to those illustrated in FIG. 15(A) to 15 (C), and those having various configurations can be used. The projecting-and-depressed sheets 8 may have the same uneven structure, and may have the mutually different uneven structures. The plurality of base sheets 91 and the plurality of cover sheets 93 may be those of the same material, and may be those of mutually different materials.

In the sanitary mask sheet 20 of the second embodiment and the sanitary mask sheet 30 of the third embodiment, it is preferred to be spaced one or both of between the projecting-and-depressed sheet 8 and the base sheet 91 at the projections of the first surface 1S and between the projecting-and-depressed sheet 8 and the cover sheet 93 at the depressions 2 of the first surface 1S. Accordingly, the soft touch is further improved, and the air permeability is further increased.

In the sanitary mask sheet 20 of the second embodiment and the sanitary mask sheet 30 of the third embodiment, it is preferred that one or both of the base sheet 91 and the cover sheet 93 are stretchable sheets. Examples of the stretchable sheet include a non-woven fabric made of stretchable fiber, a non-woven fabric made of stretchable fiber and non-stretchable fiber, and a composite non-woven fabric made of non-stretchable non-woven fabric and an elastic body (for example, elastic filament).

In this case, the projecting-and-depressed sheet 8 is preferably non-stretchable. This allows, when the sanitary mask sheets 20 and 30 are stretched in the X-direction, making a remarkable difference in tensile strength between a case where the projecting-and-depressed sheet 8 in the uneven state and a case where the projecting-and-depressed sheet 8 is to be stretched after the unevenness is lost. The developing of this remarkable difference in tensile strength allows the user of the sanitary mask sheet to recognize a tensile limit at which the projecting-and-depressed sheet 8 alone can be used without the change of the capture performance due to the change of the fiber structure by receiving a tensile load.

Here, the "stretchability" means a property that after a sheet having a length of 100 is extended to the length of 150 by applying a force in one direction, the sheet contracts to the length of 100 or more and 110 or less by releasing the force. The "non-stretchability" means a property that the sheet cannot be extended to the length of 150, or even when being able to be extended, the sheet does not contract to the length of 100 or more and 110 or less when the force is released.

In the sanitary mask sheets 20 and 30, for confirming the "stretchability" of the base sheet 91 and the cover sheet 93, with the use of the "non-stretchability" of the projecting-and-depressed sheet 8, it is only necessary to perform the confirmation by directly using the sanitary mask sheets 20 and 30 with the above-described method. Alternatively, similar to the above-described method, the sanitary mask sheets 20 and 30 may be separated into the base sheet 91, the cover sheet 93, and the projecting-and-depressed sheet 8 by delamination, and the "stretchability" of the base sheet 91 and the cover sheet 93 may be directly measured by the above-described method.

Since one or both of the base sheet 91 and the cover sheet 93 are stretchable sheets, typically, the sanitary mask sheets 20 and 30 develop the stretchability as a whole. In this case, the direction in which the projections 1 and the depressions 2 extend are preferably a direction perpendicular to an extending/contracting direction of the base sheet 91 and the cover sheet 93. The extending/contracting direction of the base sheet 91 and the cover sheet 93 is preferably a direction (the above-described other direction X) perpendicular to the extending direction (the above-described one direction Y) of the joint point line including the above-described joint points 21. That is, the extending/contracting direction of the base sheet 91 and the cover sheet 93 is preferably the above-described other direction X in which the projections 1 and the depressions 2 of the first surface 1S are alternately provided.

For example, when the sanitary mask sheets 20 and 30 are applied to the sanitary mask, it is preferred to approximately match the extending/contracting direction of the base sheet 91 and the cover sheet 93 with a direction from the mouth toward the ears from the aspect of enhancing the fitting performance. In other words, the direction in which the projection 1 and the depression 2 continuously or intermittently extend is preferably approximately perpendicular to the direction from the mouth toward the ears in the sanitary mask. Further, the direction of the joint point line including the above-described joint points 21 is preferably approximately perpendicular to the direction from the mouth toward the ears in the sanitary mask.

Accordingly, the stretch of the sanitary mask is easily developed smoothly along the direction from the mouth toward the ears, and the length in the direction connecting the nose, the mouth, and the jaw of the sanitary mask is held to make sufficiently covering the mouth and the nose of the face easy, thus easily developing the function of the sanitary mask properly.

Especially, the projecting-and-depressed sheet 8 with the filtration function has a range of motion provided by the uneven structure even when the non-stretchable material is used, and is extended and contracted by the base sheet 91 and the cover sheet 93. Accordingly, the sanitary masks including the sanitary mask sheets 20 and 30 firmly abut on the nose, the mouth, the jaw, and the peripheral area of the wearer with soft touch, and easily follow the skin surface. This followability suppresses the separation of the sanitary mask from the skin even when the contact area with the skin is reduced. Meanwhile, even when the sanitary mask firmly abuts on the skin surface, the sanitary masks including the sanitary mask sheets 20 and 30 flexibly move corresponding to the deformation and the like of the skin surface abutting at the projections 1, and the soft touch easily continues without a strained feeling. Regardless of the abutting on the skin surface, the uneven structure reduces the air flow resistance as described above, and the contact area with the skin is reduced, thus suppressing the stuffiness. Further, along the extending direction of the above-described joint point line, the sanitary mask easily reliably covers the region in the direction along the median line connecting the nose, the mouth, and the jaw of the wearer. This allows the sanitary mask to more effectively suppress the entering from the outside and the leakage to the outside of particles such as droplets.

As the base sheet 91 and the cover sheet 93, the stretchable sheet particularly preferably used is a non-woven fabric containing an elastic filament, the stretchable sheet further particularly preferably used is a composite non-woven fabric made of a non-stretchable non-woven fabric and an elastic body (for example, elastic filament).

Figures 16, 17A, 17B, 17C, 17D, 18A, 18B:
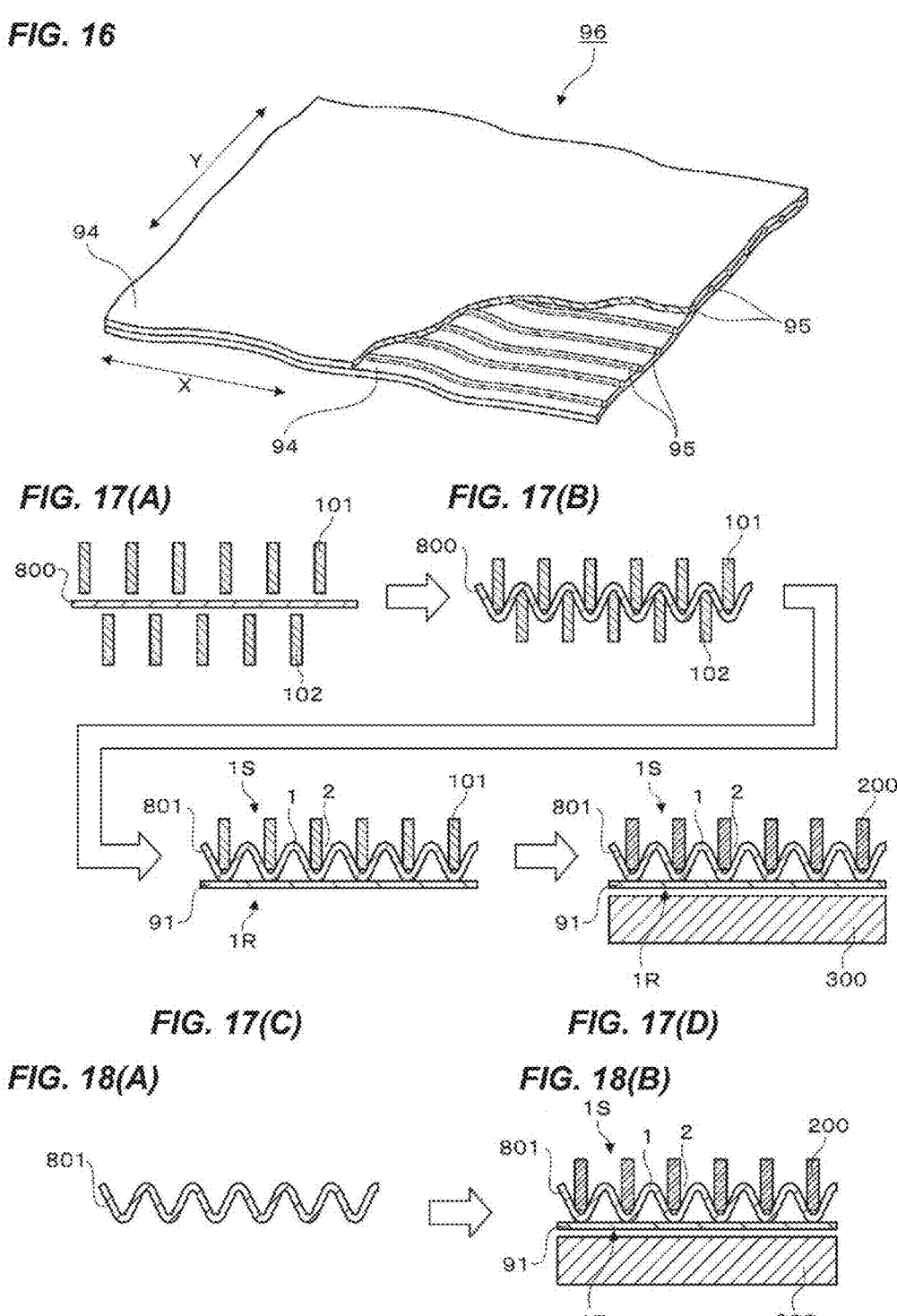
FIG. 16 is a partial cutaway perspective view illustrating a stretchable sheet used as the base sheet and the cover sheet.

Especially, a stretchable sheet 96 made of a composite non-woven fabric in which a pair of non-stretchable non-woven fabrics 94, 94 is joined by fusion bonding of an elastic filament 95. The specific example is illustrated in FIG. 16.

As the stretchable sheet, besides the stretchable sheet 96, one in which a drawing process is performed on a non-woven fabric including a blended fiber of an elastic fiber and an inelastic fiber may be used.

The elastic filament 95 is preferably joined to the non-woven fabrics 94, 94 containing the inelastic fiber in the substantially not stretched state. It is preferred that a plurality of elastic filaments 95 are joined to the pair of non-woven fabrics 94, 94.

The plurality of elastic filaments 95 are preferred to be arranged so as to extend in the above-described other direction X without mutually intersecting, and this allows the stretchable sheet 96 to extend and contract in the above-described other direction X. Additionally, this provides an advantage that the base sheet 91 and the cover sheet 93 made of the stretchable sheet 96, and the sanitary mask sheets 20 and 30 including them are less likely to cause a width contraction, which is a contraction in width perpendicular to the extending direction of the elastic filament 95, when being stretched in the direction. It is more advantageous for the suppression of the width contraction that the above-described joint point line extends in the above-described one direction Y.

The elastic filaments 95 may each extend in a straight line, or may each meanderingly extend as long as the elastic filaments 95 do not mutually intersect. The plurality of elastic filaments 95 are preferred to be arranged at intervals in the above-described one direction Y perpendicular to the above-described other direction X. This specific example is illustrated in FIG. 16.

It is preferred that one or a plurality of non-woven fabrics 94 constituting the stretchable sheet 96 are each stretchable. The one or a plurality of non-woven fabrics 94 typically contain a substantially inelastic fiber, and is substantially inelastic. The "elasticity" of the elastic filament 95 and the "inelasticity" of the non-woven fabric 94 are synonymous with the definitions of the above-described "stretchability" and "non-stretchability."

The non-woven fabric 94 is preferably stretchable in the same direction as the above-described other direction X in which the elastic filament 95 extends.

Here, "stretchable" includes (a) a case where the constituent fiber itself of the non-woven fabric 94 stretches, and (b) a case where while the constituent fiber itself does not stretch, the non-woven fabric stretches as a whole by separation of fibers mutually joined at intersection points, a structural change of the three-dimensional structure formed of a plurality of fibers by joining and the like of the fibers, breaking of the constituent fiber, stretching a slack in the fiber, or the like.

The non-woven fabrics 94 may be each already stretchable in the web form before being joined with the elastic filament 95. Alternatively, the non-woven fabrics 94 may each become stretchable by undergoing the drawing process so as to become stretchable after joining with the elastic filament 95 while the non-woven fabrics 94 are not stretchable in the web form before being joined with the elastic filament 95. Specific methods for making the non-woven fabric 94 stretchable include a heat treatment, inter-roll stretching, stretching by a bite between teeth or gears, and tensile stretching by a tenter. In view of a proper conveyability or the like of the non-woven fabric 94 when the elastic filament 95 is welded to the non-woven fabric 94, the non-woven fabric 94 is preferred to be not stretchable in the web form.

It is preferred that the plurality of elastic filaments 95 are each substantially continuous over the entire length of the stretchable sheet 96. The elastic filaments 95 each typically contain an elastic resin.

The elastic filament 95 can be a threaded synthetic rubber or a natural rubber. Alternatively, the elastic filament 95 can be one obtained by dry spinning (melt spinning) or wet spinning. The elastic filament 95 is preferably one directly obtained by melt spinning without rolling up it once.

The elastic filament 95 is preferably one obtained by drawing an undrawn thread.

The elastic filament 95 is preferably one formed by drawing an elastic resin in a melted or softened state. This allows accurately joining the elastic filament 95 with the non-woven fabric 94 in the unstretched state.

Examples of the specific operation of the drawing include (a) an operation of once obtaining an undrawn thread by melt spinning of a resin as a raw material of the elastic filament 95 and heating the elastic filament of the undrawn thread again for the drawing in a state of a softening temperature (glass transition temperature Tg of hard segment) or more, and (b) an operation of directly drawing a molten fiber obtained by melt spinning of a resin as a raw material of the elastic filament 95. It is especially preferred that the elastic filament 95 is obtained by directly drawing a molten fiber obtained by melt spinning.

It is preferred that the elastic filaments 95 are each joined with the non-woven fabric 94 over its entire length.

"Joined over its entire length" does not require that all the fibers (constituent fibers of non-woven fabric 94) in contact with the elastic filament 95 are joined with the elastic filament 95. That is, it means that the elastic filament 95 is joined with the constituent fibers of the non-woven fabric 94 in an aspect in which a purposely formed not joined portion is not present.

Examples of a manner of joining the elastic filament 95 and the non-woven fabric 94 include welding, bonding by an adhesive, and the like. It is also preferred to weld the elastic filament 95 to the non-woven fabric 94 before solidifying the elastic filament 95 obtained by melt spinning. In this case, before joining the non-woven fabric 94 with the elastic filament 95, the adhesive can be applied as auxiliary joining means. Alternatively, after joining each of the non-woven fabrics 94 with the elastic filament 95, a heat treatment (steam jet, heat embossing), mechanical bonding (needlepunching, spunlace), and the like can be performed as auxiliary joining means.

It is preferred that the joining of the non-woven fabric 94 with the elastic filament 95 is achieved only by solidifying the molten or softened elastic filament 95 in a state of contacting with the non-woven fabric 94, that is, joining without an adhesive is preferred from the aspect of the improvement of flexibility of the stretchable sheet 96.

The stretchability of the stretchable sheet 96 is developed by the elasticity of the elastic filament 95. When the stretchable sheet 96 is extended in a direction the same as the extending direction of the elastic filament 95, the elastic filament 95 and the non-woven fabric 94 are stretched. When the stretching of the stretchable sheet 96 is released, the elastic filament 95 contracts and the non-woven fabric 94 returns to the state before being stretched according to the contraction.

The stretchable sheet 96 as described above can be typically produced by a method described in paragraphs [0055] to [0085] of JP-A-2008-179128. Specifically, a molten elastic filament 95 is joined with a pair of non-stretchable non-woven fabrics 94, 94 in a not stretched state, thereby preparing a not stretched composite. By performing a drawing process for developing stretchability by passing the composite between a pair of corrugating rollers arranged to be mutually opposed in a state of mutually engageable, thus obtaining the stretchable sheet 96.

The sanitary mask sheet of the present invention can have various sheet lamination structures as long as the above-described effects are not impaired.

In the sanitary mask sheet of the present invention, any of the first surface 1S and the second surface 1R may be the skin-contacting surface of the sanitary mask.

When the first surface 1S with projecting projections 1 of the sanitary mask sheet of the present invention is used as the skin-contacting surface of the sanitary mask, it is preferred that the above-described projecting-and-depressed sheet is disposed on the outermost layer of the sanitary mask sheet of the present invention, and the outermost layer is used as the above-described skin-facing surface. In this case, when the sanitary mask sheet of the present invention is applied to a mask, the contact area of the sheet with the skin can be reduced, and a strain on the skin due to the friction can be reduced to provide a soft wearing comfort.

When the second surface 1R of the sanitary mask sheet of the present invention is used as the skin-contacting surface of the sanitary mask, it is preferred that the base sheet 91 or the cover sheet 93 is disposed on the outermost layer of the sanitary mask sheet of the present invention, and the outermost layer is used as the above-described skin-facing surface. In this case, when the sanitary mask sheet of the present invention is applied to a mask, the possibility of entering of external air from a gap in the unevenness can be more suppressed.

Next, a preferred embodiment of the method of producing the sanitary mask sheet of the present invention will be described.

First, when the sanitary mask sheet of the present invention is the sanitary mask sheet 10 of the first embodiment, a producing method in which an unevenness forming step is performed to a web sheet 800 of the projecting-and-depressed sheet 8 is preferable.

It is preferred that the above-described unevenness forming step is performed using a pair of corrugating rollers each having teeth and grooves. The pair of corrugating rollers are arranged to be mutually opposed in a state of mutually engageable, and sandwich the web sheet 800 to form the unevenness.

The teeth and the grooves of the above-described corrugating roller are preferred to be disposed in an aspect corresponding to the projections 1 and the depressions 2 of the projecting-and-depressed sheet 8.

For example, when the projecting-and-depressed sheet 8 has the uneven shape in a corrugated plate shape like the above-described projecting-and-depressed sheet 8A, the pair of corrugating rollers preferably each have stripe-shaped teeth and stripe-shaped grooves extending in the axial direction on a surface of the roller. Examples of the unevenness forming step using the corrugating roller include a method described in paragraphs [0011] to [0057] of JP-A-2007-177384.

When the projecting-and-depressed sheet 8 has the projections 1 and the depressions 2 alternately disposed to form rows in the one direction Y and the other direction X like the above-described projecting-and-depressed sheet 8B, the pair of corrugating rollers preferably each have a surface structure as described below. That is, the above-described corrugating rollers preferably each have a surface on which teeth and the grooves are alternately disposed in rows along a roller axis, a plurality of the rows are formed in a roller rotation direction, and the arrangement of the teeth is displaced by a half pitch in mutually adjacent rows. Examples of the unevenness forming step using the corrugating roller include a method described in paragraphs [0019] to [0059] of JP-A-2013-14876.

The web sheet 800 may be one including a single layer of only the above-described fine fiber layer A, and may be one in which the fine fiber layer A and the other sheet (for example, protection sheet 81) are laminated corresponding to the layer structure of the desired projecting-and-depressed sheet 8.

When the sanitary mask sheet of the present invention is the sanitary mask sheet 20 of the second embodiment, it is preferred to perform a producing method including an unevenness forming step for obtaining the projecting-and-depressed sheet 8 and a joining step of the projecting-and-depressed sheet 8 and the base sheet 91. The unevenness forming step and the joining step may be each an independent step, and may be steps to be simultaneously performed.

When the unevenness forming step and the joining step are each an independent step, it is preferred that the joining step is performed after the unevenness forming step (Embodiment (1)). In Embodiment (1), teeth 101 of one corrugating roller and teeth 102 of the other corrugating roller are pushed onto the web sheet 800 from mutually opposite sides, thus forming the unevenness (unevenness forming step). Next, the web sheet 800 is laminated on the base sheet 91 while the teeth 101 of the above-described one corrugating roller are remained to be pushed onto. In this state, the web sheet 800 becomes an uneven web sheet 801 including the projections 1 and the depressions 2 on the above-described one surface 1S. The uneven web sheet 801 and the base sheet 91 in the state of being laminated are left to stand on a pedestal 300 with the base sheet 91 in the lower side. In this state, using an assembly apparatus 200, bottom portions of the depressions 2 of the first surface 1S of the uneven web sheet 801 are partially joined with the base sheet 91 (joining step). This specific example is illustrated in FIGS. 17(A) to 17(D).

As the above-described assembly apparatus 200, it is preferred to use various kinds of those capable of performing accurate point joining at the bottom portions of the depressions 2. Accordingly, the softness of the not joined portion is held, and the soft touch of the sanitary mask sheet of the present invention can be obtained. For example, a heat sealing apparatus, an ultrasonic sealing apparatus, a high frequency sealing apparatus, or the like can be used. Among them, an ultrasonic sealing apparatus is especially preferable. These apparatuses can form the above-described joint point 21 by partial fusion bonding of members while performing dot embossing.

Not limiting to the case where the joining process is performed from the uneven web sheet 801 side as in the above-described specific example, the assembly apparatus 200 may perform the joining process from the base sheet 91 side. That is, it means that after the unevenness forming step, while the above-described teeth 102 of the other corrugating roller is remained to be pushed onto, the base sheet 91 is laminated on the uneven web sheet 801, and the assembly apparatus 200 is applied from the base sheet 91 side to perform the joining process. At this time, in the joining process, the above-described teeth 102 of the other corrugating roller serves instead of the above-described pedestal 300.

As another embodiment (Embodiment (II)) in the case where the unevenness forming step and the joining step are each an independent step, the following one is presented. First, unevenness is formed without stretching the web sheet 800, and a fixing process of the unevenness formation portion is performed to form the uneven web sheet 801. Next, the uneven web sheet 801 is laminated on the base sheet 91, and the assembly apparatus 200 is used to perform partial joining similar to the above description. This specific example is illustrated in FIGS. 18(A) and 18(B). In the case of Embodiment (II), for the unevenness forming process without stretching the web sheet 800 and the fixing process of the unevenness formation portion, examples include a method in which the uneven web sheet 801 is sandwiched by molds along the uneven shape and a tensile force is applied in the Y-direction at both ends in the Y-direction of the uneven web sheet 801, a method in which fixing portions for fixing in the uneven shape using a binder or the like is disposed at both ends in the Y-direction or the like of the uneven web sheet 801, and the like.

On the other hand, when the unevenness forming step and the joining step are simultaneously performed, for example, they are performed as follows (Embodiment (III)). That is, a method in which the partial unevenness forming process to the web sheet 800 and the joining process to the base sheet 91 are performed as a step of one unit, and the step is repeatedly performed is presented. This specific example is illustrated in FIGS. 19(A) and 19(B).

In the case of Embodiment (III), similarly to Embodiment (II), the unevenness forming without stretching the web sheet 800 is preferable.

For the example, described as the modification of the sanitary mask sheet 20 of the second embodiment, in which the fine fiber layer A is a planar sheet, and the other sheet is a projecting-and-depressed sheet 92 without the fine fiber layer A, the sanitary mask sheet can be produced similarly to the above-described method except that the materials of the sheets are interchanged.

When the base sheet 91 is a stretchable sheet, a producing method as described below is especially preferable (Embodiment (IV)).

That is, in a state where the base sheet 91 is stretched along its extending/contracting direction, a non-stretchable web sheet 800 without the unevenness is laminated. In this state, at the same time, point-joining of portions 802 to be bottom portions of the depressions 2 of the web sheet 800 with the base sheet 91 at their positions is performed. Then, the stretching of the base sheet 91 is released and the base sheet 91 is contracted. In association with this, the web sheet 800 is deformed in the uneven shape, thus forming the projecting-and-depressed sheet 8 partially joined with the base sheet 91 at the depressions 2. In the conventional unevenness forming, in the unevenness processing of the fine fiber layer A, the fiber structure is possibly damaged due to a tension or the like. However, in this producing method, since the unevenness processing of the web sheet 800 is not performed, the damage of the fiber structure due to a tension or the like in the unevenness processing of the fine fiber layer A can be avoided, and the reduction in filtering performance can be suppressed. In addition, only changing the degree of stretching the base sheet can adjust the distance between the centers of the projections as necessary. Decreasing the distance between the centers of the projections, which has been difficult in the conventional unevenness forming, can be facilitated. Since the need for handling the web sheet 800 while keeping it in the uneven shape is eliminated, the production speed can be increased, and the sanitary mask sheet 20 of the second embodiment is efficiently produced with accuracy. This specific example is illustrated in FIGS. 20(A) to 20(C).

When the sanitary mask sheet of the present invention is the sanitary mask sheet 30 of the third embodiment, joining of the cover sheet 93 with the projecting-and-depressed sheet 8 is preferably performed in each of the above-described Embodiments (I) to (IV).

Specifically, in the above-described Embodiments (I) to (III), when the uneven web sheet 801 is formed, the cover sheet 93 can be laminated after applying the binder over only the projections 1.

In the above-described Embodiment (IV), when the cover sheet 93 is a stretchable sheet, in a state where the cover sheet 93 and the base sheet 91 are stretched in the stretching direction, first, the base sheet 91 is laminated with the non-stretchable web sheet 800 without the unevenness. In this state, the point joining of the portions to be the bottom portions of the depressions 2 of the web sheet 800 and the base sheet 91 at their positions is performed by ultrasonic joining. Next, the cover sheet 93 is further laminated in the web sheet 800 side. In this state, the point joining of the portions to be tops of the projections 1 of the web sheet 800 and the cover sheet 93 at their positions is performed using a binder or the like. At this time, the joining is performed such that the positions of the joint portions of the cover sheet 93 and the web sheet 800 are different along the stretching direction with respect to the joint portions of the base sheet 91 and the web sheet 800. Then, the stretching of the cover sheet 93 and the base sheet 91 is released and the cover sheet 93 and the base sheet 91 are contracted. In association with this, the web sheet 800 is deformed in the uneven shape, thus forming the projecting-and-depressed sheet 8 in which the cover sheet 93 is partially joined with the projections 1 and the base sheet 91 is partially joined with the depressions 2. The order of laminating and joining the cover sheet 93 and the base sheet 91 to the web sheet 800 may be reversed. As the joining means, the binder may be used for both sheets. For at least one laminated and joined later, using the binder is preferable for avoiding joining of all the three sheets.

As described above, the sanitary mask sheet of the present invention can be appropriately produced.

The sanitary mask sheet of the present invention obtained as described above can be used as a sanitary mask 500 by itself. The sanitary mask 500 includes a sanitary mask body 501 that covers a face, and ear straps 502 that fix the wearing state of the sanitary mask body 501. It is preferred that at least the sanitary mask body 501 includes the sanitary mask sheet of the present invention.

Figure 21A:
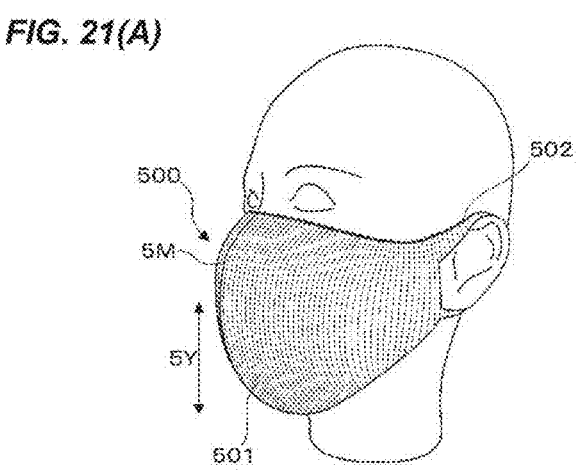
FIG. 21(A) is a perspective view illustrating a state of wearing a sanitary mask including the sanitary mask sheet of the present invention.
Figure 21B:
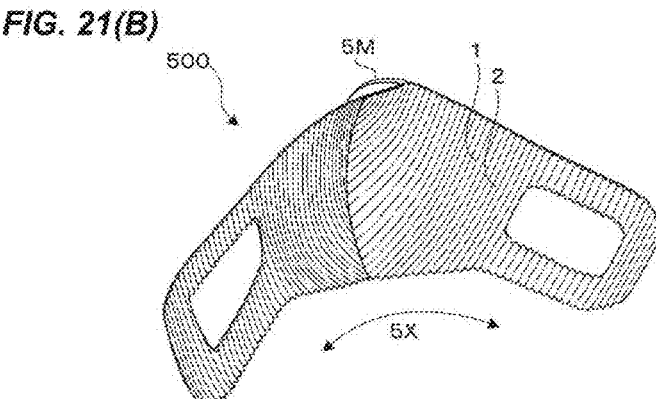
FIG. 21(B) is a perspective view illustrating the sanitary mask illustrated in FIG. 21(A) from inside.

For example, when the sanitary mask sheet of the present invention includes a projecting-and-depressed sheet (for example, projecting-and-depressed sheet 8 or projecting-and-depressed sheet 92) in which the projections 1 and the depressions 2 are provided to be continuously or intermittently extended in the one direction Y, it is preferred that the sanitary mask sheet of the present invention is incorporated in the sanitary mask body 501 as follows. That is, from the aspect of the satisfactory use feeling, it is preferred that the sanitary mask sheet of the present invention is incorporated in the sanitary mask body 501 such that the extending direction of the projections 1 is a vertical direction 5Y of the sanitary mask body 501. The vertical direction 5Y of the sanitary mask body 501 means a direction along a median line connecting the nose, the mouth, and the jaw of the wearer of the sanitary mask 500 when the sanitary mask 500 is worn. This specific example is illustrated in FIGS. 21(A) and 21(B).

When at least any one of the base sheet 91 and the cover sheet 93 includes the above-described stretchable sheet 96, and the stretchability is thereby provided as a whole, it is preferred that the sanitary mask sheet of the present invention is incorporated in the sanitary mask body 501 as follows. That is, from the aspect of improving the fitting performance of the sanitary mask body 501, it is preferred that the sanitary mask sheet of the present invention is incorporated in the sanitary mask body 501 such that the extending/contracting direction is a lateral direction 5X of the sanitary mask body 501. The lateral direction 5X of the sanitary mask body 501 means a direction from the mouth toward the ears of the wearer of the sanitary mask 500 when the sanitary mask body 501 is worn. At this time, the above-described extending/contracting direction is preferably the other direction X intersecting with the one direction Y in which the above-described projections 1 and depressions 2 extend.

Further, in the sanitary mask sheet of the present invention, it is preferred that the surface on which the projecting-and-depressed sheet is disposed as the outermost layer is used as the skin-contacting surface from the aspect of the satisfactory use feeling.

The sanitary mask sheet of the present invention is not only used as the sanitary mask body 501, but also usable as the sanitary mask body 501 and the ear straps 502. In this case, it is preferred that the sanitary mask body 501 and the ear straps 502 are integrally formed, and there is no joint such as a seam therebetween. This specific example is illustrated in FIGS. 21(A) and 21(B).

For example, when the sanitary mask sheet of the present invention includes a projecting-and-depressed sheet in which the projections 1 and the depressions 2 are provided to be continuously or intermittently extended in the one direction Y, the sanitary mask sheet of the present invention is folded in two in the other direction X intersecting with the one direction Y in which the projections 1 and the depressions 2 extend. Alternatively, the two sanitary mask sheets of the present invention are laminated to be aligned in the one direction Y in which the projections 1 and the depressions 2 extend. In each case of the folding in two and the laminating, it is preferred to arrange the surfaces on which the projecting-and-depressed sheet is disposed as the outermost layer to be mutually opposed. Next, the sheet folded in two or the laminated sheets are mutually joined. It is preferred to form the joint portion 5M in a curved shape such that the vertical center line of the sanitary mask 500 fits from the nose, the mouth, to the jaw of the wearer. The curved shape of the joint portion 5M is preferably faced in the above-described one direction Y, and is preferably a direction intersecting with the above-described extending/contracting direction. Examples of the formation means of the joint portion 5M include thermal fusion bonding, ultrasonic joining, and joining by binder. Finally, the sheet in the state of being folded in two or laminated is punched out such that the sanitary mask body 501 and the ear straps 502 are integrally formed. Through these procedures, the desired sanitary mask can be appropriately produced.

The sanitary mask sheet of the present invention can be used as, besides the sanitary mask 500 itself, a filter sheet 503 attachable to and detachable from the sanitary mask 500. For example, as the filter sheet 503 in the sanitary mask 500 that includes the sanitary mask body 501 and the filter sheet 503 disposed on the inside thereof, the sanitary mask sheet of the present invention can be used.

Figure 22:
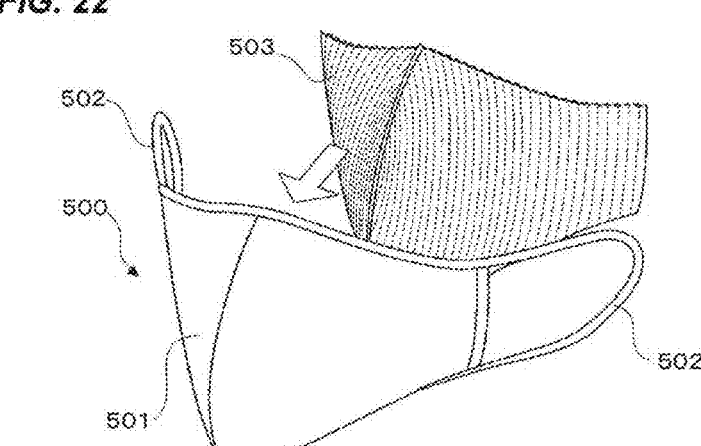
FIG. 22 is a perspective view illustrating a state where a filter sheet including the sanitary mask sheet of the present invention is attached to a sanitary mask.

The filter sheet 503 preferably has a three-dimensional shape similarly to the sanitary mask body 501. This specific example is illustrated in FIG. 22.

For example, in the sanitary mask sheet of the present invention, it is preferred that the direction of arrangement is similar to that in the case of being used for the mask body.

Further, in the sanitary mask sheet of the present invention, it is preferred that the surface on which the projecting-and-depressed sheet is disposed as the outermost layer is used as the skin-contacting surface from the aspect of the satisfactory use feeling.

The sanitary mask 500 and the filter sheet 503 using the sanitary mask sheet of the present invention are not limited to the above-described embodiments, and various configuration can be employed as long as the functions are not inhibited.

For example, only the sanitary mask body 501 may be formed of the sanitary mask sheet of the present invention, and the ear straps 502 may be formed of another material such as a rubber cord and a stretchable non-woven fabric.

The sanitary mask 500 and the filter sheet 503 to which the sanitary mask sheet of the present invention is applied may have, not the three-dimensional shape, but a rectangular shape in plan view. Further, the sanitary mask 500 and the filter sheet 503 may include several pleats extending in the lateral direction.

EXAMPLES

Hereinafter, the present invention will be described more in detail with reference to Examples, but the present invention is not limited thereto. Terms "part" and "%" in the Examples is based on mass unless otherwise noted. The symbol "—" in Table 1 below means that the relevant item has no value. The symbol "←" means the same value as a value in a left column.

Example 1

According to the producing method illustrated in FIG. 20, a sample of the sanitary mask sheet of Example 1 illustrated in FIG. 9(A) was prepared.

The base sheet 91 is formed of the stretchable sheet 96 illustrated in FIG. 16, and was produced by the following method.

Using two sheets of a spunbonded non-woven fabric made of polypropylene (hereinafter also referred to as PP) resin having an average fiber diameter of 18 μm and a basis weight of 18 g/m$^2$, a plurality of elastic filaments having a diameter of 100 μm were disposed between the two sheets of the non-woven fabric. The whole basis weight of the elastic filaments was 9 g/m$^2$. This laminated sheet was passed between a pair of corrugating rollers to develop stretchability, thus producing the stretchable sheet 96.

The projecting-and-depressed sheet 8 is one illustrated in FIG. 7 in which the protection sheet 81 and the fine fiber layer A are laminated, and was produced by the following method.

A spunbonded non-woven fabric formed of PP resin having an average fiber diameter of 15 μm and a basis weight of 17 g/m$^2$ was prepared as the protection sheet 81. Then, fibers spun by an electrospinning method were accumulated on the protection sheet, and the fine fiber layer A was laminated on the protection sheet, thus preparing the web sheet 800 of the projecting-and-depressed sheet.

Then according to the method illustrated in FIG. 20, in a state where a stretchable sheet was stretched by 1.5 times, the web sheet 800 of the projecting-and-depressed sheet was overlapped and joined, thereby producing the sanitary mask sheet.

The average fiber diameter, the basis weight, the thickness, and the density of the fine fiber layer A were as indicated in Table 1. The projection height, the pitch, and the ratio (S1/S0) of the unevenness surface area S1 per unit area S0 of the projecting-and-depressed sheet 8 were as indicated in Table 1. The thickness of the fine fiber layer A means not a height of undulation of the unevenness (apparent thickness in the thickness direction between the first surface 1S side and the second surface 1R side of the fine fiber layer A), but a thickness of the fiber layer itself along the undulation of the unevenness.

Example 2

In the same way with Example 1 except that the cover sheet 93 was laminated, a sample of the sanitary mask sheet of Example 2 that includes the laminated structure illustrated in FIG. 13(A) was prepared.

As the cover sheet 93, the spunbonded non-woven fabric indicated in Table 1 was used.

Example 3

In the same way with Example 2 except that another projecting-and-depressed sheet 8 was further laminated on the first surface 1S of the sanitary mask sheet sample S2 of Example 2, a sample of the sanitary mask sheet of Example 3 that includes the laminated structure illustrated in FIG. 15(A) was prepared.

As the other projecting-and-depressed sheet 8, the same one as the one projecting-and-depressed sheet 8 was used.

Example 4

In the same way with Example 1 except that a porous sheet formed of a polyurethane material indicated in Table 1 was used as the base sheet 91, and the laminated body of the fine fiber layer A and the protection sheet 81 was formed not to be uneven but to be flat, a sample of the sanitary mask sheet of Example 4 was prepared.

A sample cut from a commercially available product, "PITTA MASK" (trade name, manufactured by ARAX Co. LTD.) was used as the porous sheet.

Example 5

In the same way with Example 1 except that the projection height, the pitch, and the ratio (S1/S0) of the unevenness surface area S1 per unit area S0 of the projecting-and-depressed sheet 8 were as indicated in Table 1, and one indicated in Table 1 was used as the base sheet 91, a sample of the sanitary mask sheet of Example 5 was prepared.

Examples 6 and 7

In the same way with Example 1 except that the projection height, the pitch, and the ratio (S1/S0) of the unevenness surface area S1 per unit area S0 of the projecting-and-depressed sheet 8 were as indicated in Table 1, samples of the sanitary mask sheet of Examples 6 and 7 were prepared.

Example 8

In the same way with Example 1 except that the basis weight and the thickness of the fine fiber layer A were as indicated in Table 1, and the projection height, the pitch, and the ratio (S1/S0) of the unevenness surface area S1 per unit area S0 of the projecting-and-depressed sheet 8 were as indicated in Table 1, a sample of the sanitary mask sheet of Example 8 was prepared.

Comparative Example 1

In the same way with Example 1 except that the fine fiber layer A was as indicated in Table 1, and the laminated body of the fine fiber layer A and the protection sheet 81 was formed not to be uneven but to be flat, a sample of the sanitary mask sheet of Comparative Example 1 was prepared.

Comparative Example 2

In the same way with Comparative Example 1 except that the base sheet 91 was as indicated in Table 1, a sample of the sanitary mask sheet of Comparative Example 2 was prepared.

Comparative Example 3

In the same way with Example 5 except that the projecting-and-depressed sheet was formed of only the protection sheet 81 without the fine fiber layer A, a sample of the sanitary mask sheet of Comparative Example 3 was prepared.

Comparative Example 4

A commercially available mask, "PITTA MASK" (trade name, manufactured by ARAX Co. LTD.) was used as a sample of the sanitary mask sheet of Comparative Example 4.

For each of the above-described examples and comparative examples, the work of compression (WC), the linearity of compression (LC), the capture rate, and the air flow resistance were measured based on the above-described (Method for measuring work of compression (WC) and linearity of compression (LC) in thickness direction), (Method for measuring capture rate of particles having particle diameter of more than 1 μm), and (Method for measuring air flow resistance).

TABLE 1

| | Conditions/Parameter | Unit | Ex. 1 | Ex. 2 | Ex. 3 | Ex. 4 | Ex. 5 | Ex. 6 | Ex. 7 | Ex. 8 | CEx. 1 | CEx. 2 | CEx. 3 | CEx. 4 |
|---|---|---|---|---|---|---|---|---|---|---|---|---|---|---|
| Sanitary mask | Capture rate *1 | % | 90 | 92 | 99 | 92 | 89 | 91 | 92 | 96 | 83 | 94 | 5 | 4 |
| | Work of | Pa · m | 2.71 | 2.67 | 6.08 | 0.35 | 2.93 | 3.14 | 3.19 | 3.29 | 1.24 | 0.24 | 3.44 | 0.26 |

TABLE 1-continued

| Conditions/Parameter | | Unit | Ex. 1 | Ex. 2 | Ex. 3 | Ex. 4 | Ex. 5 | Ex. 6 | Ex. 7 | Ex. 8 | CEx. 1 | CEx. 2 | CEx. 3 | CEx. 4 |
|---|---|---|---|---|---|---|---|---|---|---|---|---|---|---|
| sheet | Compression (WC) Linearity of Compression (LC) | — | 0.76 | 0.75 | 0.73 | 0.57 | 0.45 | 0.74 | 0.78 | 0.79 | 0.45 | 0.46 | 0.61 | 0.63 |
| | Air flow resistance | kPa · s/m | 0.16 | 0.26 | 0.50 | 0.48 | 0.18 | 0.23 | 0.23 | 0.38 | 0.37 | 0.47 | 0.04 | 0.03 |
| Protection sheet | Kind | — | Spun-bond | ← | ← | ← | ← | ← | ← | ← | ← | ← | ← | PITTA MASK alone |
| | Average fiber Diameter D1 | μm | 15 | ← | ← | ← | ← | ← | ← | ← | ← | ← | ← | |
| | (Q2/Q1) *2 | — | 30 | ← | ← | ← | ← | ← | ← | ← | ← | ← | ← | |
| | Basis weight M1 | g/m² | 17 | ← | ← | ← | ← | ← | ← | ← | ← | ← | ← | |
| | Bending resistance | mm | 38 | ← | ← | ← | ← | ← | ← | ← | ← | ← | ← | |
| Fine fiber layer | Average fiber Diameter D1 | nm | 500 | ← | ← | ← | ← | ← | ← | ← | ← | ← | None | |
| | Basis weight M1 | g/m² | 3 | ← | ← | ← | ← | ← | ← | ← | 5 | 3 | ← | |
| | Thickness | μm | 10.5 | ← | ← | ← | ← | ← | ← | ← | 17.5 | 10.5 | ← | |
| | Density | g/cm³ | 0.29 | ← | ← | ← | ← | ← | ← | ← | ← | ← | — | |
| Shape of protection sheet and fine fiber layer | Shape | — | Furrow-ridge | ← | ← | Flat | Furrow-ridge | ← | ← | ← | Flat | ← | Furrow-ridge | PITTA MASK alone |
| | Height of projection | mm | 2 | ← | ← | | 3 | 2 | ← | ← | | | 3 | |
| | Pitch of projection | mm | 3 | ← | ← | | 3 | 2.5 | 2.8 | 4 | | | 3 | |
| | (S1/S0) *3 | m²/m² | 1.7 | ← | ← | 1.0 | 2.5 | 2.3 | 2.0 | 1.7 | 1.0 | ← | 2.5 | |
| Base sheet | Kind | — | Stretch sheet | ← | ← | Urethane sponge | Spun-bond | Stretch sheet | ← | ← | Stretch sheet | Spun-bond | ← | |
| | D2 *4 | μm | 18 | ← | ← | — | 15 | 18 | ← | ← | 18 | 15 | ← | |
| | (Q2/Q1) *5 | — | 36 | ← | ← | ← | 30 | 36 | ← | ← | 36 | 30 | ← | |
| | M2 *6 | g/m² | 45 (18/9/18) | ← | ← | — | 17 | 45 (18/9/18) | ← | ← | 45 (18/9/18) | 17 | ← | |
| Cover sheet | Kind | — | None | Spun-bond | None | ← | ← | ← | ← | ← | ← | ← | ← | |
| | D3 *7 | μm | | 15 | | | | | | | | | | |
| | (Q2/Q1) *8 | — | | 30 | | | | | | | | | | |
| | Basis weight M1 | g/m² | | 17 | | | | | | | | | | |
| | Corresponding FIG. | | FIG. 9(A) | FIG. 13(A) | FIG. 15(A) | None | FIG. 9(A) | ← | ← | ← | — | — | — | — |

Remarks: 'Ex.' means Example according to this invention, and 'CEx.' means Comparative Example.
*1: Capture rate of particles having particle diameter of more than 1 μm
*2: Ratio of average fiber diameter (Q2) of protection sheet to average fiber diameter (Q1) of fine fiber layer A
*3: Ratio of surface area S1 per unit area S0
*4: Average fiber diameter
*5: Ratio of average fiber diameter (Q2) of base sheet to average fiber diameter (Q1) of fine fiber layer A
*6: Basis weight
*7: Average fiber diameter
*8: Ratio of average fiber diameter (Q2) of cover sheet to average fiber diameter (Q1) of fine fiber layer A As indicated by Table 1, the sanitary mask sheet samples of Examples 1 to 8 had high values in both of the work of compression (WC) and the capture rate, and were able to provide both of the high capture efficiency to particles and the like in the air and the soft touch that the sanitary mask sheet samples of Comparative Examples 1 to 4 cannot achieve. In addition, the sanitary mask sheet samples of Examples 1 to 8 had high values also in the linearity of compression (LC) in addition to the above-described work of compression (WC), further had the excellent softness, and were able to keep the softness regardless of deformation in the compression direction.

The sanitary mask sheet samples of Examples 1 to 3 and 5 to 8 in which the ratio (S1/S0) of the unevenness surface area S1 per unit area S0 was increased to more than 1 were able to achieve both of the high capture rate and the low air flow resistance that were conventionally considered as a trade-off relationship. Then, the sanitary mask sheet samples of Examples 1 to 3 and 5 to 8 were able to ease the respiration through the sanitary masks using them, and able to further improve the wearing comfort.

Having described our invention as related to this embodiments and Examples, it is our intention that the invention not be limited by any of the details of the description, unless otherwise specified, but rather be construed broadly within its spirit and scope as set out in the accompanying claims.

DESCRIPTION OF SYMBOLS

1 Projection on first surface
2 Depression on first surface
3 Projection on second surface
4 Depression on second surface
8, 8A, 8B, 8C Projecting-and-depressed sheet (including fine fiber layer)
A Fine fiber layer
10, 20, 30 Sanitary mask sheet

The invention claimed is:

1. A sanitary mask sheet assembly, comprising: a plurality of sheets, wherein the plurality of sheets include: a planar-shaped base sheet, and a projecting-and-depressed sheet with a first surface and a second surface opposite the first surface and having a plurality of projections projecting outward in a thickness direction and depress ions between the plurality of projections at least on the first surface in a natural state of the sanitary mask sheet assembly, wherein the projecting-and-depressed sheet includes: a fine fiber layer having an average fiber diameter of 3000 nm or less and a density of 0.05 g/cm³ or more, and a protection sheet for the fine fiber layer, a density of the protection sheet being lower than the density of the fine fiber layer, wherein the protection sheet has a strength to protect the fine fiber layer, wherein the protection sheet has a shape laid along a first surface of the fine fiber layer, wherein the planar-shaped base sheet is laminated on the second surface of the projecting-and-depressed sheet, wherein the projecting-and-depressed sheet is joined with the planar-shaped base sheet at the depressions, wherein the protection sheet directly contacts the planar-shaped base sheet, wherein a capture rate of particles for the protection sheet is lower than a capture rate of particles for the fine fiber layer and wherein the fine fiber layer directly contacts the planar-shaped base sheet.

2. The sanitary mask sheet assembly according to claim 1, wherein the capture rates for the protection sheet and for the fine fiber layer is for particles having particle diameter of more than 1 μm.

3. The sanitary mask sheet assembly according to claim 2, wherein the capture rate for the protection sheet is 60% or less than the capture rate for the fine fiber layer.

4. The sanitary mask sheet assembly according to claim 1, wherein the average fiber diameter of the fine fiber layer is 1000 nm or less.

5. The sanitary mask sheet assembly according to claim 1, wherein the density of the fine fiber layer is more than 0.2 g/cm³.

6. The sanitary mask sheet assembly according to claim 1, wherein the average fiber diameter of the fine fiber layer is thinnest among the plurality of sheets of the sanitary mask sheet assembly.

7. The sanitary mask sheet assembly according to claim 1, wherein the protection sheet is a non-woven fabric.

8. The sanitary mask sheet assembly according to claim 1, wherein an inside of each of the plurality of projections is hollow.

9. The sanitary mask sheet assembly according to claim 1, wherein the planar-shaped base sheet is a non-woven fabric and has higher strength than the fine fiber layer.

10. The sanitary mask sheet assembly according to claim 1, wherein the projecting-and-depressed sheet is joined with the planar-shaped base sheet by fusion bonding, and a plurality of joint points between the projecting-and-depressed sheet and the planar-shaped base sheet are intermittently formed along a direction in which the depression extends and form a joint point line.

11. The sanitary mask sheet assembly according to claim 1, wherein a ratio of an average fiber diameter of the protection sheet to the average fiber diameter of the fine fiber layer is 5 or more.

12. The sanitary mask sheet assembly according to claim 1, wherein the first surface of the projecting-and-depressed sheet is a skin contact surface, and a bending resistance of the protection sheet is 20 mm or more.

13. The sanitary mask sheet assembly according to claim 1, wherein the plurality of projections and the depressions extend in a width direction of the sanitary mask sheet assembly from a first edge of the projecting-and-depressed sheet to a second edge of the projecting-and-depressed sheet opposite the first edge of the projecting-and-depressed sheet.

14. The sanitary mask sheet assembly according to claim 1, wherein an air flow resistance of the projecting-and-depressed sheet is greater than 0 kPa·s/m and 0.5 kPa·s/m or less.

15. The sanitary mask sheet assembly according to claim 1, wherein a height of the plurality of projections is 1 mm or more and 4 mm or less.

16. A sanitary mask comprising: a sanitary mask sheet assembly, including a plurality of sheets, the plurality of sheets including: a planar-shaped base sheet, and a projecting-and-depressed sheet with a first surface and a second surface opposite the first surface and having a plurality of projections projecting outward in a thickness direction and depressions between the plurality of projections at least on the first surface in a natural state of the sanitary mask sheet assembly, wherein the projecting-and-depressed sheet includes: a fine fiber layer having an average fiber diameter of 3000 nm or less and a density of 0.05 g/cm³ or more, and a protection sheet for the fine fiber layer, a density of the protection sheet being lower than the density of the fine fiber layer, wherein the protection sheet has a strength to protect the fine fiber layer, wherein the protection sheet has a shape laid along a first surface of the fine fiber layer, wherein the projecting-and-depressed sheet is joined with the planar-shaped base sheet at the depressions, wherein the protection sheet directly contacts the planar-shaped base sheet, wherein a capture rate of particles having particle diameter of more than 1 μm for the protection sheet is lower than a capture rate of particles having particle diameter of more than 1 μm for the fine fiber layer, and wherein the fine fiber layer directly contacts the planar-shaped base sheet.

17. The sanitary mask according to claim 16, wherein the protection sheet is a non-woven fabric.

18. The sanitary mask according to claim 17, wherein the projecting-and-depressed sheet is joined with the planar-shaped base sheet at the depressions; an inside of each of the plurality of projections is hollow, and the planar-shaped base sheet is a non-woven fabric.

19. The sanitary mask according to claim 16, wherein the first surface of the projecting-and-depressed sheet is a skin contact surface.

\* \* \* \* \*